(12) United States Patent
Kenny et al.

(10) Patent No.: US 12,091,856 B2
(45) Date of Patent: *Sep. 17, 2024

(54) MISSILE IMPACT RESISTANT EXTERIOR SHEATHING BUILDING PANEL

(71) Applicant: UNITED STATES GYPSUM COMPANY, Chicago, IL (US)

(72) Inventors: Timothy G. Kenny, Antioch, IL (US); Michael P. Shake, Johnsburg, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,207

(22) Filed: May 31, 2023

(65) Prior Publication Data

US 2023/0323664 A1   Oct. 12, 2023

Related U.S. Application Data

(63) Continuation of application No. 16/869,252, filed on May 7, 2020, now Pat. No. 11,702,839.
(Continued)

(51) Int. Cl.
*E04C 2/52*  (2006.01)
*B32B 5/02*  (2006.01)
(Continued)

(52) U.S. Cl.
CPC .............. *E04C 2/528* (2013.01); *B32B 5/022* (2013.01); *B32B 5/024* (2013.01); *B32B 5/028* (2013.01); *B32B 5/26* (2013.01); *B32B 13/14* (2013.01); *B32B 29/02* (2013.01); *B32B 37/15* (2013.01); *E04H 9/14* (2013.01); *B32B 2255/02* (2013.01); *B32B 2255/12* (2013.01); *B32B 2255/26* (2013.01); *B32B 2260/021* (2013.01); *B32B 2260/044* (2013.01); *B32B 2262/101* (2013.01); *B32B 2305/07* (2013.01); (Continued)

(58) Field of Classification Search
CPC ... E04C 2/528; B32B 5/028; B32B 2260/044; B32B 2305/38; B32B 2307/558; B32B 2419/00; E04H 9/14
See application file for complete search history.

(56) References Cited

U.S. PATENT DOCUMENTS 5,643,510 A    7/1997   Sucech
5,683,635 A   11/1997   Sucech et al.
(Continued)

FOREIGN PATENT DOCUMENTS

WO    2009111302 A2    9/2009

OTHER PUBLICATIONS

US 8,642,160 B2, 02/2014, Dubey et al. (withdrawn)
(Continued)

*Primary Examiner* — Jasper Saberi
(74) *Attorney, Agent, or Firm* — Vorys, Sater, Seymour and Pease LLP; Pradi Sahu; Philip T. Petti

(57) ABSTRACT

An impact resistant exterior sheathing gypsum building panel with an integrated impact resistant woven mesh which protects against impact from projectiles such as those conveyed by hurricane force winds is provided. Methods for manufacturing these exterior sheathing gypsum building panels with an integrated impact resistant woven mesh are also provided. An exterior sheathing system employing the exterior sheathing cementitious building panel is provided.

20 Claims, 10 Drawing Sheets

Related U.S. Application Data

(60) Provisional application No. 62/889,125, filed on Aug. 20, 2019.

(51) Int. Cl.
   *B32B 5/26* (2006.01)
   *B32B 13/14* (2006.01)
   *B32B 29/02* (2006.01)
   *B32B 37/15* (2006.01)
   *E04H 9/14* (2006.01)

(52) U.S. Cl.
   CPC ..... *B32B 2305/188* (2013.01); *B32B 2305/20* (2013.01); *B32B 2305/38* (2013.01); *B32B 2307/54* (2013.01); *B32B 2307/558* (2013.01); *B32B 2307/72* (2013.01); *B32B 2315/06* (2013.01); *B32B 2315/085* (2013.01); *B32B 2419/00* (2013.01); *B32B 2571/02* (2013.01); *B32B 2607/00* (2013.01)

(56) References Cited

U.S. PATENT DOCUMENTS

| | | |
|---|---|---|
| 6,119,422 A | 9/2000 | Clear et al. |
| 6,254,817 B1 | 7/2001 | Cooper et al. |
| 6,342,284 B1 | 1/2002 | Yu et al. |
| 6,494,609 B1 | 12/2002 | Wittbold et al. |
| 6,632,550 B1 | 10/2003 | Yu et al. |
| 6,694,695 B2 | 2/2004 | Collins et al. |
| 6,800,131 B2 | 10/2004 | Yu et al. |
| 6,874,930 B2 | 4/2005 | Wittbold et al. |
| 7,300,515 B2 | 11/2007 | Porter |
| RE41,592 E | 8/2010 | Lynn et al. |
| 7,846,278 B2 | 12/2010 | Porter |
| 8,030,377 B2 | 10/2011 | Dubey et al. |
| 8,062,741 B2 | 11/2011 | Tonyan et al. |
| 8,070,895 B2 | 12/2011 | Engbrecht et al. |
| 9,970,192 B2 | 5/2018 | Ravellette |
| 10,179,997 B2 | 1/2019 | Thomas et al. |
| 2002/0045074 A1 | 4/2002 | Yu et al. |
| 2004/0033749 A1 | 2/2004 | Smith et al. |
| 2004/0048110 A1 | 3/2004 | Butler |
| 2004/0084127 A1 | 5/2004 | Porter |
| 2004/0142618 A1 | 7/2004 | Porter |
| 2005/0019618 A1 | 1/2005 | Yu et al. |
| 2005/0095424 A1 | 5/2005 | Thompson |
| 2006/0035112 A1 | 2/2006 | Veeramasuneni et al. |
| 2007/0022913 A1 | 2/2007 | Wang et al. |
| 2011/0065345 A1 | 3/2011 | Phillips et al. |
| 2012/0148806 A1 | 6/2012 | Dubey et al. |
| 2014/0272404 A1 | 9/2014 | Shake et al. |
| 2016/0222646 A1 | 8/2016 | Thomas et al. |
| 2016/0264461 A1 | 9/2016 | Peng et al. |
| 2017/0326840 A1 | 11/2017 | Shake et al. |
| 2018/0093448 A1 | 4/2018 | Marskell |
| 2020/0385992 A1 | 12/2020 | Gilley et al. |

OTHER PUBLICATIONS

Notice of Acceptance No. 21-0809.02, Miami-Dade County Product Control Section, 1/2" min. USG Securerock UltraLight Glas-Mat Sheathing and Securerock Exo Air 430 Panels with PAREX EIFS and 5/8" Securerock UltraLight Glass-Mat Sheathing and 5/8" Securerock ExoAir 430 Panels with PAREX Armourwall Stucco—L.M.I., approved Nov. 3, 2022, URL :<https://www.miamidade.gov/building>, retrieved from the Internet Mar. 23, 2023.
2017 Florida Building Code—Test Protocols for High Velocity Hurricane Zone, Sixth Edition, Testing Application Standard (TAS) 201-94 Impact Test Procedures, Jul. 2017.
Standard Specification for Performance of Exterior Windows, Curtain Walls, Doors, and Impact Protective Systems Impacted by Windborne Debris in Hurricanes, E1996-17, ASTM Int'l, Jul. 16, 2019.
Standard Test Method for Impact Resistance of Class PB and PI Exterior Insulation and Finish Systems (EIFS), Designation: E2486/E2486M-13, ASTM Int'l, Jul. 16, 2019.
Acrocrete Reinforcing Mesh Balanced, open-weave glass fiber reinforcing mesh, Product Bulletin, BASF Corporation, 2018.
Reinforcing Mesh, A Balanced, Open-Weave Glass, Fiber Reinforcing Mesh, Product Bulletin, BASF Corporation, 2016.
Senergy® Reinforcing Mesh, BASF Construction Chemicals UAE LLC, URL: <www.master-builders-solutions.basf.ae>, retrieved from the Internet Jan. 30, 2019.
Standard Test Method for Thickness of Textile Materials, Designation: D1777-96 (Reapproved 2015), ASTM Int'l, Aug. 13, 2019.
Standard Test Method for Resistance of Organic Coatings to the Effects of Rapid Deformation (Impact), Designation: D2794-93 (Reapproved 2019), ASTM International, Aug. 8, 2019.
Standard Test Methods for Mass Per Unit Area (Weight) of Fabric, Designation: D3776/D3776M-09a (Reapproved 2017), ASTM International, Aug. 13, 2019.
Standard Test Method for Breaking Force and Elongation of Textile Fabrics (Strip Method), Designation: D5035-11 (Reapproved 2019), ASTM International, Aug. 13, 2019.
Reinforcing Mesh, Glass Fiber Mesh For Reinforcing Dryvit Base Coats, DS413, Dryvit Systems, Inc., Oct. 4, 2016.
Standard Specification for Performance of Exterior Windows, Curtain Walls, Doors, and Impact Protective Systems Impacted by Windborne Debris in Hurricanes, Designation: E1996-17, ASTM International, Aug. 8, 2019.
Standard Terminology for Exterior Insulation and Finish Systems (EIFS), Designation: E2110-17, ASTM International, Aug. 8, 2019.
Standard Test Method for Impact Resistance of Class PB and PI Exterior Insulation and Finish Systems (EIFS), Designation: E2486/E2486M-13 (Reapproved 2018), ASTM International, Aug. 8, 2019.
Fiberglass Reinforcing Mesh for EIFS Construction and Insulation, Fiberglass Mesh for Reinforcing of EIFS and Insulation System, URL: <https://www.reinforcingmesh.net/reinforcing-mesh/fiberglass-reinforcing-mesh.html>, retrieved from the Internet Jan. 30, 2019.
Aggre-flex Mesh, Master Wall Inc., 2016.
Safety Data Information Sheet (Regulation (CE) 1907/2006-Reach), PAREX, Safety Data Information Sheet, pp. 1-6, Version 1(Jun. 11, 2013).
Reinforcing Meshes, PAREXUSA, Aug. 2018.
Product Bulletin, Sto Mesh & Sto Detail Mesh, Sto Corp., S155-80919,80920,81920, Revision No. A3.0, Date: Jun. 2016.
Structural Design, International Code Council, 6th Edition (2017), pp. 529-530.
Product Bulletin, Senergy®, Reinforcing Mesh, Balanced, open weave glass fiber reinforcing mesh, Master Builders Solutions, URL: <www.senergy.master-builders-solutions.com.en>, Sep. 2022, retrieved from the Internet Dec. 21, 2022.
Product Bulletin, Sto Reinforcing Meshes, Sto Corp. Jan. 2020.
Aggre-Flex Mesh, Product Data, Master Wall Inc., 2022.
PAREX®, Parex EIFS Details, CSI Section 07 24 00, PAREX USA Inc., Dec. 2009, URL: <https://www.lahabrastucco.com/literature/old-lit/PEIFSD.pdf>, retrieved from the Internet Mar. 18, 2023.
PAREX®, Parex Eifs, PAREX USA Inc., Sep. 2009, URL<https://www.awci.org/buyersguide/files/Parex_MPC12.pdf>, retrieved from the Internet Mar. 18, 2023.
PAREXUSA, Continuous Insulation Systems Application Guide, PAREX USA Inc., Sep. 2017, URL: <https://www.parex.com/docs/librariesprovider5/additional-product-literature/application-guide/pusaeifsapg.pdf?Status=Master&sfvrsn=ea25b47c_17&Status=Master&sfvrsn=ea25b47c_17>, retrieved from the Internet Mar. 18, 2023.
Notice of Acceptance No. 20-1005.07, Miami-Dade County Product Control Section, Corev-PRECOR-SB Wall System, Approved Oct. 7, 2021, URL:<https://www.miamidade.gov/building/pc-result_app.asp?fldNOA=&Classification=0%2CUnknown+%2F+Unselected%2C1&AdvancedSearch=Go&applicantlist=0&categorylist=2&subcategorylist=2&materiallist=0&impactlist=0&fldMDPP=0.00&fldMDPN=0.00 >, retrieved from the Internet Mar. 23, 2023.
Notice of Acceptance No. 20-0625.01, Miami-Dade County Product Control Section, Parex R-Ogg Eifs System-LMI, Approved Sep. 10,

(56) References Cited

OTHER PUBLICATIONS

2020, URL :<https://www.miamidade.gov/building/pc-result_app.asp?fldNOA=&Classification=0%2CUnknown+%2F+Unselected%2C1&AdvancedSearch=Go&applicantlist=0&categorylist=2&subcategorylist=2&materiallist=0&impactlist=0&fldMDPP=0.00&fldMDPN=0.00 >, retrieved from the Internet Mar. 23, 2023.
Notice of Acceptance No. 20-0602.04, Miami-Dade County Product Control Section for a building cladding labelled: Total Stop Adhered Moisture Drainable EIF System, approved Jul. 2, 2022 approved Nov. 3, 2022, URL: <https://www.miamidade.gov/building/pc-result_app.asp?fldNOA=&Classification=0%2CUnknown+%2F+Unselected%2C1&AdvancedSearch=Go&applicantlist=0&categorylist=2&subcategorylist=2&materiallist=0&impactlist=0&fldMDPP=0.00&fldMDPN=0.00 >, retrieved from the Internet Mar. 23, 2023.
PAREXUSA, Aug. 2018, Parex USA, https://www.parex.com/docs/librariesprovider5/additional-product-literature/product-data-sheets-msds/reinforcing-meshes.pdf?Status=Master&sfvrso=b5465c70_14 (Year: 2018).

FIG. 2
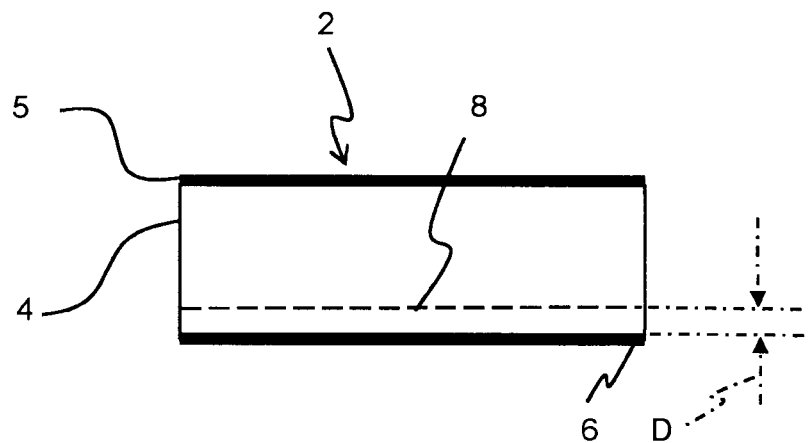
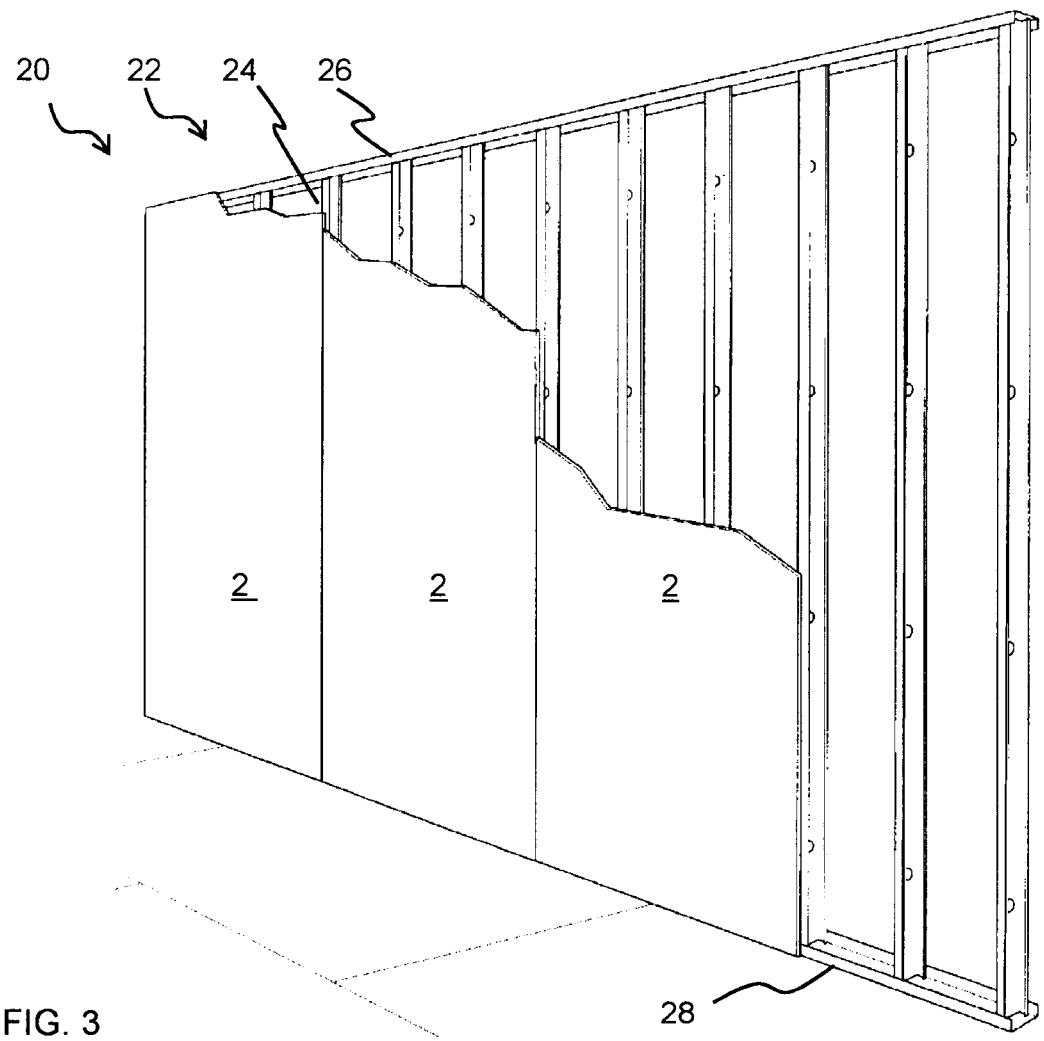
FIG. 3

MISSILE IMPACT RESISTANT EXTERIOR SHEATHING BUILDING PANEL

CROSS-REFERENCE TO RELATED APPLICATIONS

This is a continuation of U.S. patent application Ser. No. 16/869,252, filed May 7, 2020, which claims the benefit of U.S. Provisional Application No. 62/889,125, filed Aug. 20, 2019, each incorporated herein by reference.

FIELD OF THE INVENTION

This invention relates to a hurricane resistant gypsum exterior sheathing building panel and methods for manufacturing and installing the panel. The product would be used on the exterior of a building to provide impact resistance in high impact applications such as hurricane resistant housing requiring significant mechanical strength at or along the outer surface of the exterior sheathing building panel to prevent failure due to projectile impact.

BACKGROUND OF THE INVENTION

In states such as Florida where geographic location subjects buildings and homes to high winds, perhaps of hurricane force, building standards require walls and building panels to withstand certain impacts, such as impact of an eight foot long two inch by four inch wooden stud weighing about 9 pounds (4.1 kg) which impacts endwise on the panel face at 34 miles per hour (about 50 feet per second, 15.2 m/s). After such impact, the impacted area resists at least one-third the vacuum pressure the panel resisted before impact, starting at a pre-impact minimum of about 90 pounds per square foot.

There is a need for missile impact resistant gypsum panel, for example in hurricane zones to meet such standards. Current practices to meet high velocity hurricane zone (HVHZ) large scale missile impact resistance require field installation involving additional labor steps and field applied materials such as field applied impact resistant meshes.

Currently impact resistant meshes are all field applied materials. Current system installations involve fastening GMS (glass mat sheathing) substrate panels to traditional framing members in a variety of spacing schedules depending on the architect's design requirements. Additionally, subsequent layering of basecoat, impact resistant mesh, foam, basecoat, surface crack resistant mesh and finish layer(s) (such as stucco) are installed as EIFS (energy insulation finishing system) components. Typically the impact mesh component used is critical to meeting the high velocity hurricane zone large missile impact resistance requirements. This is an additional step above and beyond normal EIFS system requirements. This incurs material and labor costs along with scheduling restraints in the installations.

There remains a desire for new missile impact damage resistant gypsum panel articles which are easy to install for use in high wind areas subject to prone to hurricane force winds, as well as methods of preparing such articles.

BRIEF SUMMARY OF THE INVENTION

The invention relates to an improved gypsum exterior sheathing building panel which would provide large scale missile impact resistance as required in high velocity hurricane zones (HVHZ), coastal areas. The proposed panel would be a product pre-assembled at the factory to include elements required to meet HVHZ performance standards. This would simplify installation in the field thereby reducing delivered system costs and time to install by contractors. In the present specification the term pre-fabricated means the panel is made to have the elements required to meet HVHZ performance standards, for example an embedded impact resistant mesh layer, at a manufacturing facility before delivery to a building site.

The building panel of the invention would include an embedded impact resistant woven mesh in the gypsum core. This would eliminate the need to field apply a comparable mesh and basecoat to attain the required system performance.

In one aspect, the present disclosure is directed to a building panel, suitable as an exterior sheathing gypsum building panel, which provide large scale missile impact resistance as required in high velocity hurricane zones (HVHZ), coastal areas.

In particular, the invention provides an exterior sheathing building panel comprising from front to back:
a first fibrous mat,
a gypsum core layer having front and rear surfaces, the gypsum core layer having a thickness of 0.5 to 1.25, preferably 0.5 to 1, inches, wherein the first fibrous mat is attached as a facer cover sheet to the front surface of the gypsum core layer,
an impact resistant woven scrim mesh, embedded ¼ to 1/16 inch, preferably ⅛ to 1/16 inch, from the rear surface of the gypsum core layer,
a second fibrous mat attached as a backer cover sheet to the rear surface of the gypsum core layer,
wherein the gypsum core layer comprises at least 75 wt. % calcium sulfate material, wherein the gypsum core layer comprises less than 10 wt. % magnesium oxide, preferably less than 5 wt. % magnesium oxide, most preferably an absence of magnesium oxide;
wherein the first fibrous mat and second fibrous mat respectively comprise paper or fibrous material of at least one of polymer fibers, glass fibers, mineral fibers or a combination thereof,
wherein the impact resistant mesh has an Impact Range Classification of >150 in-pounds (>17.0 J) (also known as "Ultra-High") according to ASTM E2486 (2018) Standard Test Method for Impact Resistance of Class PB and PI Exterior Insulation and Finish Systems (EIFS).

The rear mat is always partially embedded to bond the back facer to the panel core. The mesh is always spaced from the rear mat to form a gap filled with slurry to bond the mat to core bond. Typically the gap is about 1/16 inch-⅛ inch embedment. The slurry penetration into the mat ranges from 40 to 60% of the mat thickness.

Typically the above-described impact resistant mesh has one or more of the following properties:
fabric surface weight of 20 to 30 ounces per square yard (690 to 1035 g/m$^2$) (measured according to ASTM D3776/D3776M-09a (2017), Standard Test Methods for Mass Per Unit Area (Weight) of Fabric, ASTM International, West Conshohocken, PA, 2017),
a thickness of 0.040 to 0.045 inches (1.02 to 1.14 mm) (measured according to ASTM D-1777-96(2015), Standard Test Method for Thickness of Textile Materials, ASTM International, West Conshohocken, PA, 2015), and
a minimum tensile strength of 350 to 540 pounds-force per inch (2.41 to 3.72 MPa) in the warp and weft, respectively (measured according to ASTM D-5035-11 (2019), Standard Test Method for Breaking Force and Elongation of Textile Fabrics (Strip Method), ASTM International, West Conshohocken, PA, 2019).

In particular, the exterior sheathing building panel of the invention meets 2017 Florida Building Code Test—Protocols for High-Velocity Hurricane Zone, Chapter 16, Section 1626, Sixth Edition, to be capable of resisting a 2 inches×4 inches (51 mm×102 mm) missile weighing 9 pounds (4.1 kg) in accordance with 2017 Florida Building Code Test—Testing Application Standard (TAS) 201-94 Impact Test Procedures. Per Section 1626.2.4, the missile shall impact the surface of each test specimen at a speed of 50 feet per second (34 miles per hour; 15.2 m/s). Typically this missile is a 2 inch×4 inch×8 foot wood stud.

Thus, generally the exterior sheathing building panels of the invention are capable of preventing panel penetration by an eight foot long two inch by four inch missile (projectile such as a 2 inch×4 inch×8 foot wood stud) weighing about 9 pounds (4.1 kg.) and impacting the panel face endwise at 34 miles per hour.

After such impact, the impacted area resists at least one-third the vacuum pressure the panel resisted before impact, starting at a pre-impact minimum of about 90 pounds per square foot.

2017 Florida Building Code Test—Protocols for High-Velocity Hurricane Zone, Chapter 16, Section 1626, Sixth Edition establishes the 2017 Florida Building Code definition of the missile and the impact resistance requirement for building components requiring large missile impact resistance in jurisdictions designated a high velocity hurricane zone (HVHZ). Florida Building Code Test Protocols for High-Velocity Hurricane Zones, Chapter 16, Section 1626, Sixth Edition, 2017 is a stricter standard than, for example, that set forth in ASTM International's Standard Classification for Abuse-Resistant Nondecorated Interior Gypsum Panel Products and Fiber-Reinforced Cement Panels (ASTM C1629) which applies to panels for use in high traffic areas (e.g., such as dormitories, hospitals, etc.).

2017 Florida Building Code Test—Testing Application Standard (TAS) 201-94 Impact Test Procedures covers procedures for conducting the impact testing of materials as required by the Test—Protocols for High-Velocity Hurricane Zone, Chapter 16, Section 1626, Sixth Edition. 2017 Florida Building Code Test—Testing Application Standard (TAS) 201-94 Impact Test Procedures test procedures provide a means of determining whether a particular product used as wall cladding, exterior windows, glazing, exterior doors, skylights, glass block, shutters and any other similar devise used as external protection to maintain the envelope of the building, provides sufficient resistance to wind-borne debris.

In another aspect, the invention provides methods of preparing gypsum exterior sheathing building panels of the invention described in the present disclosure. The method of making the building panel, comprises:

depositing a first fibrous mat as a face mat on a surface,
mixing at least water and calcium sulfate material to prepare an aqueous gypsum slurry comprising at least 75 wt. % calcium sulfate material on a dry (water free) basis, wherein said calcium sulfite material comprises calcium sulfate hemihydrate,
wherein the aqueous gypsum slurry comprises less than 10 wt. % magnesium oxide on a dry (water free) basis, preferably less than 5 wt. % magnesium oxide on a dry (water free) basis, most preferably an absence of magnesium oxide;
applying the aqueous gypsum slurry in a bonding relation to the face mat to form a gypsum core layer, the gypsum core layer having a face side and a back side, wherein the gypsum core layer face side faces said face mat;
applying an impact resistant woven scrim mesh on the back side of the gypsum core layer to embed the impact resistant woven scrim mesh into the gypsum core layer, wherein the impact resistant mesh has an Impact Range Classification of >150 in-pounds (>17.0 J) (also known as "Ultra-High") according to ASTM E2486 (2018) Standard Test Method for Impact Resistance of Class PB and PI Exterior Insulation and Finish Systems (EIFS);
applying a second fibrous mat as a back mat on the back side of the gypsum core layer having the embedded impact resistant mesh to form a board precursor, thereby locating the aqueous slurry between the face mat and the back mat;
allowing the aqueous gypsum slurry located between the face mat and the back mat to set, thereby forming the gypsum exterior sheathing building panel.

The gypsum core of the gypsum panel comprises set gypsum, namely calcium sulfate dihydrate resulting from setting the aqueous gypsum slurry comprising calcium sulfate hemihydrate and optionally calcium sulfate anhydrite. Typically when the calcium sulfate material and water are mixed the resulting aqueous gypsum slurry has at least 75 wt. %, preferably at least 85 wt. %, most preferably at least 95 wt. %, on a dry basis calcium sulfate hemihydrate. In other words, the aqueous gypsum slurry is at least 75 wt. %, preferably at least 85 wt. %, most preferably at least 95 wt. %, on a dry basis calcium sulfate hemihydrate prior to setting.

In another aspect, the present disclosure is directed to an exterior sheathing system comprising framing to which is attached at least one exterior sheathing building panel of the invention which prevents water penetration and air leakage. In particular, the invention provides an exterior sheathing building panel of the invention as described in the present disclosure, wherein the impact resistant mesh faces towards the framing. The exterior sheathing building panel of the invention would be used on the exterior of a building, typically an exterior wall, to provide an impact resistant barrier. The framing is of wood, metal or any other building framing material. The exterior sheathing building panels are attached to the framing by screws, nails, glue, or other building fasteners. Preferably the exterior sheathing building panel has no perforations except for perforations made by the screws or nails.

For purposes of this specification the terms "board" and "panel" are interchangeable.

These and other advantages of the present invention, as well as additional inventive features, will be apparent from the description of the invention provided herein.

BRIEF DESCRIPTION OF THE DRAWINGS

FIG. 2 shows a side cross sectional view of the gypsum exterior sheathing building panel of FIG. 1 with the impact resistant woven scrim mesh embedded in its gypsum core.

FIG. 3 shows a perspective view of the exterior sheathing building panel of the present invention attached to one side of a metal stud wall suitable in the exterior wall system of the present invention.

DETAILED DESCRIPTION OF THE INVENTION

Figure 1:
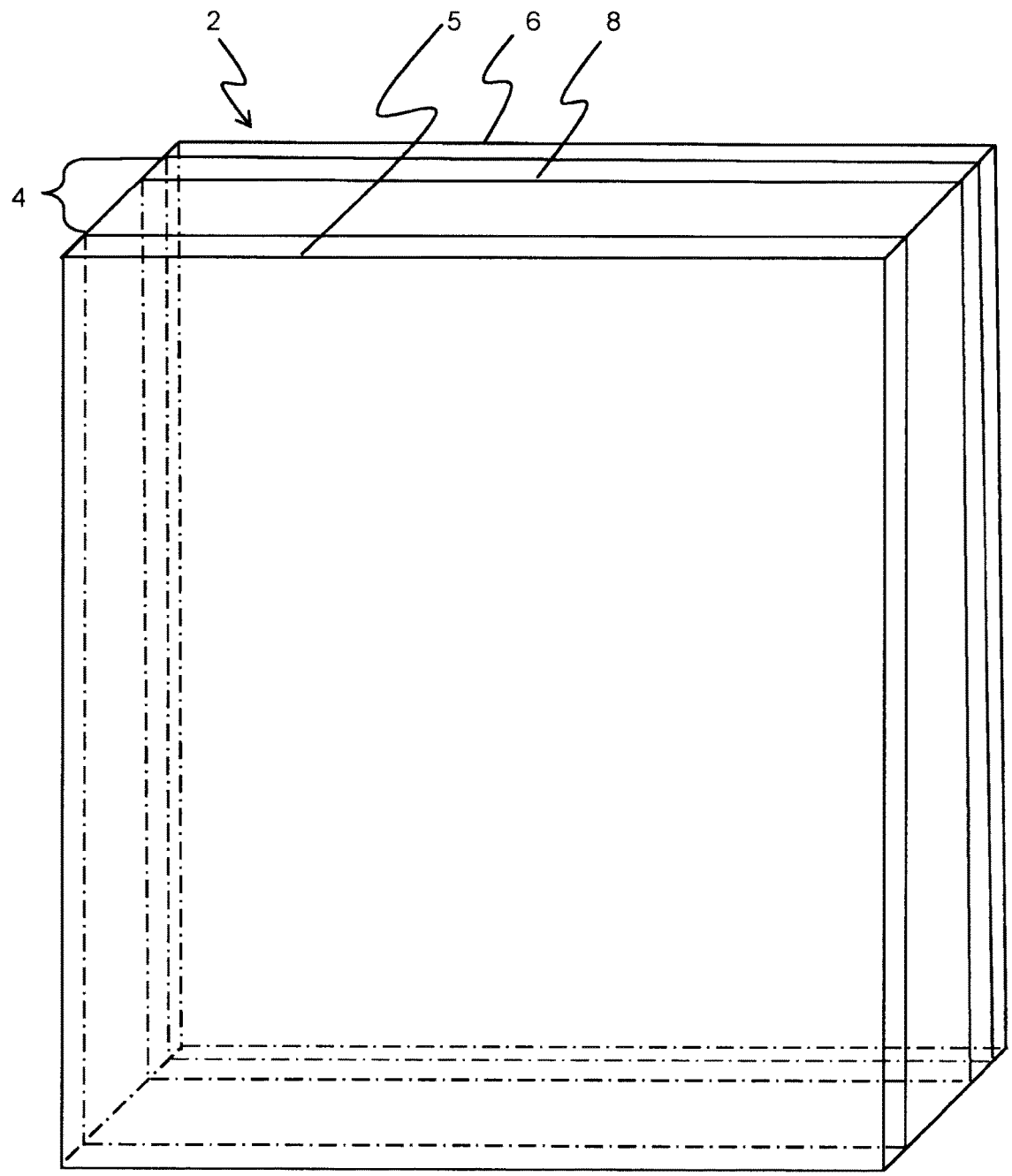
FIG. 1 shows a perspective view of a first example of a gypsum exterior sheathing building panel of the present invention with an impact resistant woven scrim mesh embedded in its gypsum core.

The present invention is an exterior sheathing building panel with an impact resistant woven mesh embedded in the gypsum core. The product would be used on the exterior of a building to provide large scale missile impact resistance as required in high velocity hurricane zones (HVHZ), coastal areas.

In particular, the present invention is a building panel suitable as an exterior sheathing panel comprising, from front to back:
a first fibrous mat,
a gypsum core layer having front and rear surfaces, the gypsum core layer having a thickness of 0.5 to 1.25, preferably 0.5 to 1, inches, wherein the first fibrous mat is attached as a facer cover sheet to the front surface of the gypsum core layer,
an impact resistant woven scrim mesh, embedded ¼ to 1/16 inch, preferably ⅛ to 1/16 inch, from the rear surface of the gypsum core layer,
a second fibrous mat attached as a backer cover sheet to the rear surface of the gypsum core layer,
wherein the gypsum core layer comprises at least 75 wt. % calcium sulfate material, wherein the gypsum core layer comprises less than 5 wt. % magnesium oxide, preferably an absence of magnesium oxide layer;
wherein the first fibrous mat and second fibrous mat respectively comprise paper or fibrous material of at least one of polymer fibers, glass fibers, mineral fibers or a combination thereof,
wherein the impact resistant mesh has an Impact Range Classification of >150 in-lbs (>17.0 J) (also known as "Ultra-High") according to ASTM E2486 (2018) Standard Test Method for Impact Resistance of Class PB and PI Exterior Insulation and Finish Systems (EIFS).

The rear mat is always partially embedded to bond the back facer to the panel core. The mesh is always spaced from the rear mat to form a gap filled with slurry to bond the mat to core bond. Typically the gap is about 1/16 inch-⅛ inch embedment. The slurry penetration into the mat ranges from 40 to 60% of the mat thickness.

Typically the above-described impact resistant mesh has one or more, preferably all, of the following properties:
fabric surface weight of 20 to 30 ounces per square yard (690 to 1035 $g/m^2$) (measured according to ASTM D3776/D3776M-09a (2017), Standard Test Methods for Mass Per Unit Area (Weight) of Fabric, ASTM International, West Conshohocken, PA, 2017),
a thickness of 0.040 to 0.045 inches (1.02 to 1.14 mm) (measured according to ASTM D-1777-96(2015), Standard Test Method for Thickness of Textile Materials, ASTM International, West Conshohocken, PA, 2015), and
a minimum tensile strength of 350 to 540 pounds-force per inch (2.41 to 3.72 MPa) in the warp and weft, respectively (measured according to ASTM D-5035-11 (2019), Standard Test Method for Breaking Force and Elongation of Textile Fabrics (Strip Method), ASTM International, West Conshohocken, PA, 2017).

In ASTM D3776/D3776M-09a (2017), Standard Test Methods for Mass Per Unit Area (Weight) of Fabric, ASTM International, West Conshohocken, PA, 2017) fabric mass is calculated from the mass of a specimen the length and width of which have been measured as directed in one of the procedures of Test Method D3773 and D3774-18.

ASTM D3773/D3773 M-10(2019), Standard Test Methods for Length of Woven Fabric, ASTM International, West Conshohocken, PA, 2019 includes test methods which cover four options for measuring fabric length and are applicable to full rolls or bolts of materials. There are four approved options of measuring length as follows: option A—hand, option B—drum, option C—clock, and option D—folding. The length is measured from one end of the fabric to the other, using a suitable graduated device, or apparatus as described in the option used. The values stated in either SI units or in U.S. customary units shall be regarded separately as standard. The values stated in each system may not be exact equivalents; therefore, each system must be used independently of the other, without combining values in any way.

ASTM D3774-18, Standard Test Method for Width of Textile Fabric, ASTM International, West Conshohocken, PA, 2018, includes a test method which covers the measurement of the width of woven or knitted fabrics, usable width, or both. The method is applicable to full rolls, bolts of fabric, and short specimens removed from a roll or bolt. Unless otherwise specified, measurements shall include the selvages when present. The method offers two options: Option A—Full Roll or Bolt or Option B—Short Specimen Removed from Full Roll or Bolt. The values stated in either SI units or U.S. customary units are to be regarded as standard. The U.S. customary units may be approximate.

In ASTM D-1777-96(2015), Standard Test Method for Thickness of Textile Materials, ASTM International, West Conshohocken, PA, 2015) a specimen is placed on the base of a thickness gauge and a weighted presser foot lowered. The displacement between the base and the presser foot is measured as the thickness of the specimen. The test is conducted in the standard atmosphere for testing textiles, which is 21+/−2° C. (70+/−2° F.) and 65+/−2% relative humidity (RH).

In ASTM D-5035-11(2019), Standard Test Method for Breaking Force and Elongation of Textile Fabrics (Strip Method), ASTM International, West Conshohocken, PA, 2017) a test specimen is clamped in a tensile testing machine and a force applied to the specimen until it breaks. Values for the breaking force and elongation of the test specimen obtained from machine scales, dials, autographic recording charts, or a computer interfaced with the testing machine. This test method describes procedures for carrying out fabric tensile tests using four types of specimen, and three alternative types of testing machines. For reporting, use the following system to identify specific specimen and machine combinations:

Type of Specimen:
   1R—25 mm (1.0 in.) raveled strip test
   2R—50 mm (2.0 in.) raveled strip test
   1C—25 mm (1.0 in.) cut strip test
   2C—50 mm (2.0 in.) cut strip test Type of Tensile Testing Machine:
   E—constant-rate-of-extension (CRE)
   L—constant-rate-of-load (CRL)
   T—constant-rate-of-traverse (CRT)

Possible combinations can be identified as follows in TABLE 1:

TABLE 1

| Test Specimen | Type of Tester | | |
| --- | --- | --- | --- |
| | Constant-Rate of-Extension | Constant-Rate of-Load | Constant-Rate of-Traverse |
| 25-mm (1-in.) raveled strip | 1R-E | 1R-L | 1R-T |
| 50-mm (2-in.) raveled strip | 2R-E | 2R-L | 2R-T |
| 25-mm (1-in.) cut strip | 1C-E | 1C-L | 1C-T |
| 50-mm (2-in.) cut strip | 2C-E | 2C-L | 2C-T |

For example, 1R-E refers to a 25-mm (1-in.) raveled strip test carried out on a constant-rate-of-extension tensile testing machine. This test method covers raveled strip and cut strip test procedures for determining the breaking force and elongation of most textile fabrics. The raveled strip test is applicable to woven fabrics while the strip test is applicable to nonwoven fabrics, felted fabrics, and dipped or coated fabrics. The values stated in either SI units or in U.S. customary units shall be regarded separately as standard. The values stated in each system may not be exact equivalents; therefore, each system must be used independently of the other, without combining values in any way.

In particular, the exterior sheathing building panel of the invention meets 2017 Florida Building Code Test—Protocols for High-Velocity Hurricane Zone, Chapter 16, Section 1626, Sixth Edition, to be capable of resisting a 2 inches×4 inches (51 mm×102 mm) missile weighing 9 pounds (4.1 kg) in accordance with 2017 Florida Building Code Test—Testing Application Standard (TAS) 201-94 Impact Test Procedures. Per Section 1626.2.4, the missile shall impact the surface of each test specimen at a speed of 50 feet per second (34 miles per hour; 15.2 m/s). Typically this missile is a 2 inch (5.08 cm)×4 inch (10.16 cm)×8 foot (234 cm) wood stud.

FIG. 1 shows a perspective view of an exterior sheathing building panel 2 of the present invention which is a gypsum panel. The exterior sheathing building panel 2 has a gypsum core 4 and front facing 5 on its front side and rear facing 6 on its rear side. The impact resistant woven mesh 8 is embedded in the core 4 near, but spaced from, the rear facing at the rear side of the panel 2. The impact resistant woven mesh 8 is positioned in a plane that is substantially parallel to both the front facing 5 and rear facing 6. The front facing 5 and rear facing 6 may be respective paper sheets, but are preferably respective fibrous mats.

FIG. 2 shows a cross-sectional view of the exterior sheathing panel 2 of the present invention of FIG. 1.

The impact resistant woven mesh 8 is embedded a distance "D" of ¼ to 1/16 inch (6.35 to 1.59 mm), preferably ⅛ to 1/16 inch (3.175 to 1.59 mm), from the cementitious layer rear surface.

The impact resistant woven mesh 8 is embedded in the core 4 near, but spaced from, the rear facing 6 at least 1/16 inch (1.59 mm), typically ⅛ to 1/16 inch (3.175 to 1.59 mm).

The core of the gypsum panel comprises set gypsum, namely calcium sulfate dihydrate. This results from setting a gypsum slurry comprising calcium sulfate hemihydrate.

Fibrous Mat Facings

The first fibrous mat and second fibrous mat facings (also known as cover sheets) are located at the faces of the exterior sheathing building panels of the present invention. It will be appreciated that each fibrous mat has two facing surfaces: an outwardly facing surface and a surface facing the gypsum core.

The first fibrous mat and second fibrous mat respectively comprise paper or fibrous material selected from at least one of polymer fibers, glass fibers, mineral fibers or a combination thereof.

Although sheathing can be made with water resistant paper facers, for mold resistance, non-paper designs are preferred as they are more robust to the elements and mold growth resistance. Thus, preferably the gypsum exterior sheathing building panels of the invention have an absence of paper front and back facings. Thus, preferably the first fibrous mat and second fibrous mat of the gypsum exterior sheathing building panels are respectively fibrous material selected from at least one of polymer fibers, glass fibers, mineral fibers or a combination thereof. More preferably the gypsum exterior sheathing building panels of the invention as a whole have an absence of paper. Preferably the gypsum exterior sheathing building panels of the invention have an absence of cellulose, particularly an absence of cellulose fibers.

The fibrous mat can comprise any suitable type of polymer fiber, glass fiber, mineral fiber, or combination thereof. The choice of fibers will depend, in part, on the type of application in which the cementitious sheathing panel is to be used. For example, when the sheathing panel is used for applications that require heat or fire resistance, appropriate heat or fire resistant fibers should be used in the fibrous mat.

Mineral fibers are fibrous inorganic substances made primarily from rock, clay, slag, or glass. These fibers are classified into three general groups: fiberglass (glass wool and glass filament), mineral wool (rock wool and slag wool), and refractory ceramic fibers (RCF).

Examples of fiber materials suitable for use in the fibrous mat include, but are not limited to, glass fibers, polyamide fibers, polyaramid fibers, polypropylene fibers, polyester fibers (e.g., polyethylene terephthalate (PET)), polyvinyl alcohol (PVOH), polyvinyl acetate (PVAc), and combinations thereof. Preferably the fibers consist of coated or uncoated glass fibers (also known as coated or uncoated fiberglass). Typically the fibers consist of coated or uncoated alkaline resistant glass fibers (also known as coated or uncoated alkaline resistant fiberglass).

The fibrous mats can be woven or non-woven. However, non-woven mats are preferred. The non-woven mat typically has a small amount of binder homogeneously dispersed therethrough. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof. Suitable fibrous mats include commercially available mats used as facing materials for cementitious exterior sheathing panels.

Furthermore, the fibers of the mat can be hydrophobic or hydrophilic, coated or uncoated.

Uncoated mat is typically about 12 to about 30, more typically 12 to 25, most typically 14 to 20 lbs/MSF. Uncoated mat includes the fibers and a polymer binder. For purposes of the present specification the term "pre-coated non-woven glass fiber mat" typically is a mat having a coating of about 45 lbs/MSF to about 60 lbs/MSF, wherein the coating uniformly penetrates the glass mat substrate from one side of the coated glass mat to a depth which is a fraction of the thickness of the coated glass mat. Thus, in addition to the at most small amount of substantially uniformly distributed polymer binder which an uncoated mat has, a pre-coated mat has an additional binder coating of polymer binder and inorganic filler applied to one side to penetrate at most partially through the thickness of the mat. Thus, a pre-coated non-woven glass fiber mat has one side coated with the binder coating and the other side uncoated to expose a raw glass fiber side. The term "pre-coated" is employed in the present specification where the non-woven glass fiber mat is coated with the binder coating before contacting a cementitious aqueous slurry that will become a core of a board.

When employing a pre-coated mat if a hydrophobic finish composition layer is also employed then the hydrophobic finish composition layer is adhered to the coated surface of the coated fibrous mat rather than the raw glass fiber side. The cementitious-based core is adhered to the raw glass fiber side.

A pre-coated mat differs from an uncoated mat. For example, an acrylic pre-coated glass mat differs from an "uncoated" glass mat using acrylic binder.

For purposes of the present specification an uncoated glass fiber mat is typically a glass fiber mat having an overall weight of 15-40 lbs/MSF and has at most a small amount of polymer binder substantially uniformly distributed, for example 19-27 wt % of the overall mat is polymer binder, but there is no inorganic filler. The thickness of an uncoated glass mat is typically 20-40 mil.

Also, a pre-coated mat is heavier than the uncoated mat. A pre-coated mat, in addition to the weight of the non-woven glass mat substrate, has 40-165 lbs./MSF (pounds per thousand square feet) of binder coating coated on one side of the non-woven glass mat substrate. The weight of the non-woven glass mat substrate prior to applying the binder coating is 10-50 lbs./MSF. Thus, after applying the binder coating to make the pre-coated glass mat the weight of this pre-coated glass mat is 50-215 lbs./MSF. Preferably the non-woven glass mat substrate before coating weighs between about 12 and about 50 lbs./MSF, more preferably about 14.5-26.5 lbs./MSF. Preferably 50-100 lbs./MSF, more preferably 61 to 75 lbs./MSF, of binder coating is coated on one side of the non-woven glass mat substrate. On average, the weight of the coated glass mat per unit area is no more than about six times the weight of the glass mat substrate prior to coating. The coating preferably also imparts a tensile strength to the coated glass mat which on average is at least 1.33 times greater than the tensile strength of the glass mat substrate without the coating.

The binder coating comprises binder polymer and inorganic filler. The binder coating is substantially uniformly distributed across the one side of the mat. Thus, the binder coating only partially permeates into the glass mat substrate. The other side exposes raw glass fibers coated at most with a small amount of binder polymer and no inorganic filler. The binder coating uniformly penetrates the glass mat substrate to a desired fractional thickness of the coated glass mat. The penetration of the binder coating into the glass mat substrate extends a depth of from 10% of a thickness of the coated glass mat to 75% of the thickness of the coated glass mat.

Gypsum Core

The gypsum core of the gypsum exterior sheathing building panel primarily comprises calcium sulfate material, along with any suitable additives.

A gypsum panel useful in the present invention comprises a gypsum core comprising greater than 75 weight % calcium sulfate material, typically at least 85 weight % calcium sulfate material, more typically at least 95 weight % calcium sulfate material. Generally the gypsum panel useful in the present invention comprises a gypsum core comprising greater than 75 weight % calcium sulfate dihydrate, typically at least 85 weight % calcium sulfate dihydrate, more typically at least 90 weight % calcium sulfate dihydrate, most typically at least 95 weight % calcium sulfate dihydrate.

A typical gypsum panel core is made from setting an aqueous gypsum slurry mixture having over 90 wt. %, more typically over 95 wt. % calcium sulfate hemihydrate (stucco) on a dry (water free) basis.

Suitable calcium sulfate material include any one or more of water-soluble calcium sulfate anhydrite, calcium sulfate alpha-hemihydrate, calcium sulfate beta-hemihydrate, natural, synthetic or chemically modified calcium sulfate hemihydrates "calcined gypsum"), calcium sulfate dihydrate ("gypsum," "set gypsum," or "hydrated gypsum"), and mixtures thereof. As used herein, the terms "calcium sulfate" or "calcium sulfate material" refer to any of the forms of calcium sulfate referenced above.

Preferably the cores of the gypsum boards of the invention have less than 10 wt. % magnesium oxide. More preferably the cementitious cores of the gypsum boards and cement boards of the invention have less than 5 wt. % magnesium oxide. Most preferably the cementitious cores of the gypsum boards and cement boards of the invention have an absence of magnesium oxide.

The gypsum core can be of any type or shape suitable for the exterior sheathing building panel of the present invention. Non-limiting examples of such building panels include gypsum panels of any size and shape. A typical gypsum panel, including its core and facings, is a ½" to 1.25" (1.27 to 3.175 cm), most typically about ⅝ inches (1.6 cm), thick coated glass-mat board.

The overall thickness of the exterior sheathing building panel can generally be any thickness commonly used in the construction industry. Generally, the exterior sheathing building panel can be about ½ inch (1.27 cm) to 1.25 inch (3.175 cm) in thickness, typically about ½ inch (1.27 cm) to about 1 inch (2.54 cm), more typically about ½ inch (1.27 cm) to about ¾ inch (1.90 cm). For example, the exterior sheathing building panel can have a thickness of about ½ inch (1.27 cm), about ⅝ inch (1.6 cm), about ¾ inch (1.90 cm), or about 1 inch (2.54 cm).

The width of the exterior sheathing building panel can generally be any width commonly used in the construction industry. For example, the width can be about 32 inches (81 cm), about 36 inches (91 cm), about 48 inches (122 cm), or about 54 inches (137.2 cm).

The length of the exterior sheathing building panel can generally be any length commonly used in the construction industry. For example, the length can be about 60 inches (152 cm), about 72 inches (183 cm), about 96 inches (244 cm), about 120 inches (304 cm), and 144 inches (366 cm).

Optionally the gypsum core comprises hydraulic cement. However, typically there is less than 10 wt'%, less than 5 wt. % or an absence of hydraulic cement ASTM defines "hydraulic cement" as follows: a cement that sets and hardens by chemical interaction with water and is capable of doing so under water. There are several types of hydraulic cements that are used in the construction and building industries. While calcium sulfate hemihydrate does set and harden by chemical interaction with water, it is not included within the broad definition of hydraulic cements in the context of this invention. All of the aforementioned hydraulic cements can be used to make the panels of the invention.

Suitable hydraulic cements include any one of more of Portland cement, sorrel cement, fly ash cement, slag cements such as blast-furnace slag cement and super-sulfated cements, calcium sulfoaluminate cement, calcium alumina cement, expansive cements, white cement, and rapid setting and hardening cements. The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition.

Other additives can be included as desired, including, for example, starch for enhancing the strength of the board (e.g., non-migrating starches such as pregelatinized starch, ethoxylated starches, etc), dispersant (e.g., naphthalene sulfonate), polyphosphate (e.g., sodium trimetaphosphate), accelerator (e.g., heat resistant accelerator), retarder, water resistance additive (e.g., siloxane), fire resistance additive (e.g., vermiculite, ATH), etc. The additives for the cementitious core can be any additives commonly used to produce fibrous mat-faced gypsum panels. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. However, there may be an absence of any one or more of these additives.

If desired, an antimicrobial/antifungal agent is added to a cementitious core for the gypsum panel and/or a cover sheet. Suitable antimicrobial agents include 2-(4-thiazolyl) benzimidazole, silver zeolite, zinc oxide and zinc pyrithione. However, there may be an absence of any one or more of these additives.

Advantageously, the cementitious core also comprises a hydrophobic agent, such as a silicone-based material (e.g., a silane, siloxane, or silicone-resin matrix), in a suitable amount to improve the water resistance of the core material. It is also preferred that the cementitious core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect the method of preparing a water-resistant fibrous mat-faced cementitious panel of the invention, or as described, for example, in U.S. Patent Publications 2006/0035112 A1 or 2007/0022913 A1. Desirably, the cementitious core also comprises strength-improving additives, such as phosphates (e.g., polyphosphates as described in U.S. Pat. Nos. 6,342,284, 6,632,550, and 6,800,131 and U.S. Patent Publications 2002/0045074 A1, 2005/0019618 A1, and 2007/0022913 A1) and/or pre-blended unstable and stable soaps (e.g., as described in U.S. Pat. Nos. 5,683,635 and 5,643,510). However, there may be an absence of any one or more of these additives.

The cementitious core can comprise paper or glass fibers, but is preferably substantially free of paper and/or glass fibers (e.g., comprises less than about 1 wt. %, less than about 0.5 wt. %, less than about 0.1 wt. %, or even less than about 0.05 wt. % of paper and/or glass fibers, or contains no such fibers). However, preferably there is an absence of cellulose.

Impact Resistant Mesh

The impact resistant woven mesh embedded in the core material will provide mechanical properties to the exterior sheathing building panel of the present invention.

In the invention "mesh" and "mat" are separate terms. A "Mesh", also known as a scrim, is a woven open grid mat used for embedding in the core. Mesh is used for the impact resistant woven mesh of the building panels of the invention. A "Mat" is woven or non-woven, preferably non-woven, sheet that is much tighter to prevent bleed through or slurry penetration during production. Mat is used for the cover sheets of the building panels of the invention.

The impact resistant woven mesh is made of woven fibers in the form of yarns or rovings woven together in any number of formations. Yarns comprise a group of individual fibers bundled together, normally by a twisting process, to form each yarn. Instead of yarns, rovings can also be used to form the woven scrim. Rovings are formed by laying the individual fibers together in a substantially parallel fashion and binding them together through known binding techniques. Either yarns or rovings may be used to create the woven scrims and the term "end", as used herein, shall mean either yarns or rovings. In addition, while measurements disclosed herein refer to yarns (e.g., yarns per inch), it will be understood that the same measurements apply to rovings.

The impact resistant woven mesh fibers can be synthetic polymer fibers, basalt fibers, carbon fibers, or alkaline resistant glass fibers. Typical synthetic polymer fibers are polyamide fibers, especially aramid fibers, for example, KEVLAR fibers, TWARON fibers, NOMEX fibers, or TECHNORA fibers. Also suitable can be natural fibers that are free of unsuitable contamination, such as hazardous impurities.

The impact resistant mesh, embedded ¼ to ¹⁄₁₆ inch, preferably ⅛ to ¹⁄₁₆ inch, from the cementitious layer surface, has an Impact Range Classification of >150 in-lbs (>17.0 J) (also known as "Ultra-High") according to ASTM E2486/E286M-13 (Reapproved 2018) Standard Test Method for Impact Resistance of Class PB and PI Exterior Insulation and Finish Systems (EIFS). This test subjects specimens to deformation by a falling standard weight. The impact resistance classification is determined by the number of joules (inch-pounds) achieved when at least six out of ten tests do not display broken reinforcing mesh visible to the naked eye under normal lighting conditions.

The test employs test apparatus as specified in the Apparatus Section of Test Method ASTM D2794-93(2019) Standard Test Method for Resistance of Organic Coatings to the Effects of Rapid Deformation (Impact), ASTM International, West Conshohocken, PA, 2019, except that the cylindrical weight shall be 1.82 kg (4.0 pounds), the EIFS (Exterior Insulation and Finish Systems) specimen shall fit below the tube, and the diameter of the hemispherical head of a steel punch used as an indenter shall be 13 mm (1.2 inches) and it shall be made to fit inside the guide tube instead of resting on the test panel. The test apparatus as specified in the Apparatus Section of Test Method D2794-1993 R19 Edition Standard Test Method for Resistance of Organic Coatings to the Effects of Rapid Deformation (Impact) consists of a vertical tube to guide a cylindrical weight that is dropped on a steel punch resting on a test panel. The vertical tube (guide tube) is 24 to 48 inch (0.6 to 1.2 m) long mounted vertically on a base plate. A slot is cut lengthwise on one side of the tube to act as a guide for a cylindrical weight inside the tube. Graduations are marked in inch pounds along the slot. The base is made such that the EIFS specimen can be inserted at 2 inches (50 mm) below the tube. The weight fits inside the guide tube. A pin is fitted into one side of the weight to act as a guide by riding in the slot of the tube and to serve as a handle by which the weight can be raised and released and serve as the indicator of inch-pounds (kilogram-meters). There is also an indenter which is the steel punch with a hemispherical head. The punch is held vertically by the guide ring. There is also a panel support which is a steel fixture with a 0.64 inch (16.3 mm) diameter cylindrical hole centered under the indenter for supporting the test panel.

The test specimen has an EIFS (Exterior Insulation and Finish Systems) base coat, reinforcing mesh, and finish coat applied to 600 by 1200 mm (2 by 4 foot) sections of 25-mm (1-in) thick insulation board. (EIFS terminology is known according to ASTM E2110-17 Standard Terminology for Exterior Insulation and Finish Systems (EIFS), ASTM International, West Conshohocken, PA (2017)). This terminology covers terms and definitions pertaining to materials and processes used in the design and application of exterior insulation and finish systems (EIFS). The reinforcing mesh is continuous with no laps or joints. A base coat is the initial wet-state material, either factory or field-mixed, used to encapsulate the nonmetallic reinforcing mesh or fasten the insulation to the substrate. The reinforcing mesh is nonmetallic reinforcing mesh which is, for example, fiberglass, component of the EIFS. In the invention this mesh is encapsulated in the gypsum core to strengthen the system. The finish coat is the final wet-state material, which provides color and texture, applied over the base coat.

The specimens are allowed to cure at least 298 days at 22+/−3° C. (72+/−5° F.) and 50+/−5% % relative humidity. The test is performed in the same environment or immediately after removal. In this test the tester weighs the specimens and records the type and density of the insulation board of the specimens. The specimens, with the coated side up, are placed flat against a smooth, flat rigid surface. The weight is put into the tube up to the minimum value of the impact range where it is expected that less than 40% of the ten tests will fail. The Standard Impact Resistance Impact Range Classification has an Impact Range of 2.8-5.6 J (25-49 inch-pounds). The Medium Impact Resistance Impact Range Classification has an Impact Range of 5.7-10.1 J (50-89 inch-pounds). The High Impact Resistance Impact Range Classification has an Impact Range of 10.2-17.0 J (90-150 inch-pounds). The Ultra-High Impact Resistance Impact Range Classification has an Impact Range of Over 17.0 J (150 inch-pounds). Then the weight is released to drop from the tube onto the test panel specimen. Ten tests are performed at the minimum value. No impacts are within 100 mm (4 inches) from the edges of the specimen or within 100 mm (4 inches) of a prior impact). Then the specimen is removed from the support surface and observed to determine if the impact area has any broken reinforcing mesh. If there is breakage in more than four of ten tests then the test is repeated at the next lower range.

Typically the above-described impact resistant mesh has one or more of the following properties:

fabric surface weight of 20 to 30 ounces per square yard (690 to 1035 g/m$^2$) (measured according to ASTM D3776/D3776M-09a (2017), Standard Test Methods for Mass Per Unit Area (Weight) of Fabric, ASTM International, West Conshohocken, PA, 2017), a thickness of 0.040 to 0.045 inches (1.02 to 1.14 mm) (measured according to ASTM D-1777-96(2015), Standard Test Method for Thickness of Textile Materials, ASTM International, West Conshohocken, PA, 2015), and a minimum tensile strength of 350 to 540 pounds-force per inch (2.41 to 3.72 MPa) in the warp and weft, respectively (measured according to ASTM D-5035-11 (2019), Standard Test Method for Breaking Force and Elongation of Textile Fabrics (Strip Method), ASTM International, West Conshohocken, PA, 2017).

The impact resistant woven mesh can be strengthened by coating the impact resistant woven mesh with a resin.

Generally the impact resistant woven mesh will have a higher areal weight and higher minimum tensile strength in the warp and weft than the respective facer mats.

The mesh size of the impact resistant woven mesh should allow the gypsum slurry to pass through the scrim. The nominal construction or nominal mesh size is typically measured by yarns per inch and is given as a number by number value that corresponds to the number of weft yarns and warp yarns present in an inch of the scrim.

The impact resistant woven mesh may be any of a number of types of woven scrim patterns, including, a leno scrim, a plain woven scrim, a basket woven scrim, a mock leno woven scrim, a twill woven scrim, or a satin woven scrim.

A leno scrim has "fill" or "weft" ends (i.e., horizontal ends) that are wrapped and/or twisted around "warp" ends (i.e., vertical ends) to lock the ends in place in a woven configuration. While a leno scrim can comprise ends made from any number of materials, it is preferred that the ends of the leno scrim be made up of fiberglass. A plain woven scrim configuration has ends that cross over and under one another to create the woven scrim. A basket woven scrim configuration has sets of two weft ends that cross over and under other sets of two warp ends to create the woven scrim. A mock leno woven scrim configuration has ends that run in groups both vertically and horizontally, locking each other in place at the interlacing. A twill woven scrim configuration has interlacing of the ends arranged to form a distinct diagonal line on the scrim surface. A satin woven scrim configuration has warp ends that cross over three or more consecutive weft ends, then under the next weft end, back over three or more consecutive weft ends, and such pattern is repeated until the scrim is completed. Similarly, the weft ends of the satin woven scrim passes over three or more of consecutive warp ends, then under the next warp end, back over three or more consecutive warp ends, and such pattern is repeated until the scrim is completed. While several exemplary woven scrims are described herein, it will be appreciated by one skilled in the art that any type of woven scrims can be used.

A. Methods of Making Building Panels

The invention makes the building panels by the following steps.

depositing a first fibrous mat as a face mat on a surface, mixing at least water and calcium sulfate material to prepare an aqueous gypsum slurry comprising at least 75 wt. % calcium sulfate material on a dry (water free) basis, wherein said calcium sulfite material comprises calcium sulfate hemihydrate, wherein the aqueous gypsum slurry comprises less than 10 wt. % magnesium oxide on a dry (water free) basis, preferably less than 5 wt. % magnesium oxide on a dry (water free) basis, most preferably an absence of magnesium oxide;

applying the aqueous slurry in a bonding relation to the face mat to form a gypsum core layer, the gypsum core layer having a face side and a back side, wherein the gypsum core layer face side faces said face mat;

applying an impact resistant woven scrim mesh on the back side of the gypsum core layer to embed the impact resistant woven scrim mesh into the gypsum core layer;

applying a second fibrous mat as a back mat on the back side of the gypsum core layer having the embedded impact resistant mesh to form a board precursor, thereby locating the aqueous slurry between the face mat and the back mat;

allowing the aqueous slurry located between the face mat and the back mat to set, thereby forming the building panel.

The gypsum core of the gypsum panel comprises set gypsum, namely calcium sulfate dihydrate resulting from setting the aqueous gypsum slurry comprising calcium sulfate hemihydrate and optionally calcium sulfate anhydrite.

Although the aqueous slurry being deposited is known as aqueous gypsum slurry the majority, generally at least 70 wt. %, of the calcium sulfate material it contains when deposited is calcined gypsum (calcium sulfate hemihydrate) which will set during processing to convert to gypsum (calcium dihydrate). Typically the aqueous gypsum slurry contains 75 to 100 wt. % reactive powder on a dry (water free) basis, to provide the aqueous gypsum slurry with at least 75 wt. % calcium sulfate material on a dry (water free) basis, preferably at least 75 wt. % calcium sulfate hemihydrate on a dry (water free) basis.

Typically when the calcium sulfate material and water are mixed the resulting aqueous gypsum slurry has at least 75 wt. %, preferably at least 85 wt. %, most preferably at least 95 wt. %, on a dry basis calcium sulfate hemihydrate. In other words, the aqueous gypsum slurry is at least 75 wt. %, preferably at least 85 wt. %, most preferably at least 95 wt. %, on a dry basis calcium sulfate hemihydrate prior to setting.

In the invention the cementitious slurry preferably does not entirely penetrate the first and second fibrous mats. Preferably, the cementitious slurry penetrates 30-60% of the thickness of each mat, more preferably 40-60% of the thickness of each mat.

The manufacturing method of the gypsum exterior sheathing building panels of the present invention typically involves depositing cementitious slurry (e.g., a mixture containing stucco and water, where stucco refers to calcined gypsum, typically comprised primarily of calcium sulfate hemihydrate and optionally calcium sulfate anhydrite) over a first mat facing material and covering the wet slurry, then embedding the impact resistant mesh, and then covering the wet slurry with a second mat facing material, such that the cementitious slurry and impact resistant mesh are sandwiched between the two mat facing materials. The cementitious slurry is allowed to harden (e.g., set to form an interlocking matrix of calcium sulfate dihydrate, referred to as set gypsum) to produce a solid article prior to final drying in a kiln.

Methods of preparing the fibrous mat-faced cementitious gypsum panel according to the invention typically comprise placing a bottom facing material (that will become the front facing) onto a conveyor belt, or onto a forming table that rests on the conveyer belt, and transporting the bottom facing material by the conveyor belt so that it passes underneath an aqueous slurry discharge. The aqueous slurry is discharged from a mixer through the mixer's discharge conduit or boot, which spreads the slurry on the bottom facing material. Once the aqueous slurry is deposited on the bottom facing material, a moving continuous impact resistant woven mesh is placed on top of the slurry and bottom facing material through the use of a conveyor system. The aqueous gypsum slurry passes through the openings of the impact resistant woven mesh and the impact resistant woven mesh becomes embedded into the slurry.

A moving, continuous top facing material (that will become the rear facing) is placed on top of the embedded impact resistant woven mesh, the slurry and bottom facing material through the use of another conveyor system. In this manner, the slurry with the embedded impact resistant woven mesh is positioned in between the top and bottom facing materials to form the gypsum building panel; so that, as shown in FIG. 2, the embedded impact resistant woven mesh is in a parallel plane and near and/or adjacent to the top facing material. The building panel can then pass through a forming station, which forms the wallboard to the desired thickness and width. The panel then sets and dries.

A typical method for preparing a cementitious gypsum panel of the invention can be conducted on existing gypsum board manufacturing lines used to make fibrous mat-faced cementitious boards known in the art. Briefly, the process typically involves discharging a fibrous mat material onto a conveyor, or onto a forming table that rests on a conveyer, which is then positioned under the discharge conduit (e.g., a gate-canister-boot arrangement as known in the art, or an arrangement as described in U.S. Pat. Nos. 6,494,609 and 6,874,930) of a mixer. The components of the cementitious slurry are fed to the mixer comprising the discharge conduit, where they are agitated to form the cementitious slurry. Foam can be added in the discharge conduit (e.g., in the gate as described, for example, in U.S. Pat. Nos. 5,683,635 and 6,494,609).

The aqueous gypsum slurry can be deposited onto the fibrous mat facing material in accordance with known methods and on existing manufacturing lines for preparing a fibrous mat-faced cementitious panel. For instance, when the aqueous gypsum slurry is discharged onto the fibrous mat facing material, the slurry is spread, as necessary, over the fibrous mat facing material. Once the slurry is deposited on the bottom facing material, a moving continuous woven scrim is placed on top of the slurry and bottom facing material through the use of a conveyor system. The slurry passes through the openings of the scrim and the scrim becomes embedded into the slurry. Then a second facing material, which may be a fibrous mat or other type of permeable facing material (however preferably not paper), is placed on top of the embedded scrim. The wet cementitious assembly thereby provided is conveyed to a forming station where the article is sized to a desired thickness, and to one or more knife sections where it is cut to a desired length to provide a cementitious board. The fibrous mat-faced cementitious panel is allowed to harden, and, optionally, excess water is removed using a drying process (e.g., by air-drying or transporting the fibrous mat-faced cementitious panel through a kiln). In particular, the gypsum building panel travels along a belt line for several minutes, during which time the rehydration reaction occurs and the board stiffens. The gypsum building panels are then cut into a desired length and fed into a large, continuous kiln for drying. During drying, the excess water (free water) is evaporated from the gypsum core while the chemically bound water is retained in the newly formed gypsum crystals.

Each of the above steps, as well as processes and equipment for performing such steps, are known in the art.

It also is common in the manufacture of cementitious building panels such as gypsum building panels to deposit a relatively dense layer of slurry onto the first facing material before depositing the primary slurry, and to use vibration in order to eliminate large voids or air pockets from the deposited slurry. Also, hard edges, as known in the art, are sometimes used. These steps or elements (dense slurry layer, vibration, and/or hard edges) optionally can be used in conjunction with the invention.

Thus, optionally, a dense gypsum layer can be applied in between the core and the face mat, and optionally between the core and the back mat. For example, stucco and water are inserted into the main mixer, while foam is inserted downstream in the discharge conduit, meaning that foam is not inserted in the main mixer body. The main mixer can be a pin mixer or a pin-less mixer, as desired. A portion of the slurry, which is essentially foamless, is diverted from the mixer from an exit port generally opposite the discharge conduit to form the concentrated layer slurry. The main mixer acts as a pump to drive the unfoamed slurry out the smaller discharge port for the dense slurry which flows through the pressurized slurry line. Additives in wet form are injected into the pressurized slurry line through injection ports. The line is desirably long enough, which is within the level of ordinary skill, to allow for uniform mixing of slurry and additives. There is no need for separate introduction of stucco or water. If desired, two mixers can be used, with the second mixer for separately formulating a dense layer (skim coat or skim layer), e.g., with less or no foam, to be deposited between the core and one or both mats.

If desired to provide further water resistance to the fibrous mat-faced cementitious gypsum panel the method of making the fibrous mat-faced cementitious panel may further comprise (a) preparing an aqueous siloxane dispersion comprising about 4 wt. % to about 8 wt. % siloxane in water, and (b) combining the siloxane dispersion with the cementitious mixture to provide the cementitious slurry to be deposited onto a facing or other type of substrate, and subsequently allowed to harden, thereby providing the fibrous mat-faced cementitious panel.

System

In another aspect, the present disclosure is directed to a system comprising framing to which is attached at least one exterior sheathing building panel of the invention which provides impact resistance. In particular, the invention provides an exterior sheathing panel comprising, from front to back:

a first fibrous mat,
a gypsum core layer having front and rear surfaces, the gypsum core layer having a thickness of 0.5 to 1.25, preferably 0.5 to 1, inches, wherein the first fibrous mat is attached as a facer cover sheet to the front surface of the gypsum core layer,
an impact resistant woven scrim mesh, embedded ¼ to 1/16 inch, preferably ⅛ to 1/16 inch, from the rear surface of the gypsum core layer,
a second fibrous mat attached as a backer cover sheet to the rear surface of the gypsum core layer,
wherein the gypsum core layer comprises at least 75 wt. % calcium sulfate material, wherein the gypsum core layer comprises less than 10 wt. % magnesium oxide, preferably less than 5 wt. % magnesium oxide, most preferably an absence of magnesium oxide;
wherein the first fibrous mat and second fibrous mat respectively comprise paper or fibrous material of at least one of polymer fibers, glass fibers, mineral fibers or a combination thereof,
wherein the impact resistant mesh has an Impact Range Classification of >150 in-pounds (>17.0 J) (also known as "Ultra-High") according to ASTM E2486 (2018) Standard Test Method for Impact Resistance of Class PB and PI Exterior Insulation and Finish Systems (EIFS).

Typically the above-described impact resistant mesh has one or more, preferably all, of the following properties:
fabric surface weight of 20 to 30 ounces per square yard (690 to 1035 g/m$^2$) (measured according to ASTM D3776/D3776M-09a (2017), Standard Test Methods for Mass Per Unit Area (Weight) of Fabric, ASTM International, West Conshohocken, PA, 2017),
a thickness of 0.040 to 0.045 inches (1.02 to 1.14 mm) (measured according to ASTM D-1777-96(2015), Standard Test Method for Thickness of Textile Materials, ASTM International, West Conshohocken, PA, 2015), and
a minimum tensile strength of 350 to 540 pounds-force per inch (2.41 to 3.72 MPa) in the warp and weft, respectively (measured according to ASTM D-5035-11 (2019), Standard Test Method for Breaking Force and Elongation of Textile Fabrics (Strip Method), ASTM International, West Conshohocken, PA, 2017).

In particular, the exterior sheathing building panel of the invention meets 2017 Florida Building Code Test—Protocols for High-Velocity Hurricane Zone, Chapter 16, Section 1626, Sixth Edition, to be capable of resisting a 2 inches×4 inches (51 mm×102 mm) missile weighing 9 pounds (4.1 kg) in accordance with 2017 Florida Building Code Test—Testing Application Standard (TAS) 201-94 Impact Test Procedures. Per Section 1626.2.4, the missile shall impact the surface of each test specimen at a speed of 50 feet per second (34 miles per hour; 15.2 m/s). Typically this missile is a 2 inch×4 inch×8 foot wood stud.

Thus, generally, exterior sheathing building panel of the invention are capable of preventing panel penetration by an eight foot long two inch by four inch missile (projectile such as a 2 inch×4 inch×8 foot wood stud) weighing about 9 pounds (4.1 kg.) and impacting the panel face endwise at 34 miles per hour. Generally exterior sheathing building panel of the invention are also capable of providing a vacuum resistance through the panel after impact of at least one-third the resistance prior to impact, which was in excess of 90 psf.

Any of the integrated panels described herein can be part of a system that includes an integrated panel that is adhered to one or more wall studs or ceiling joists via a fastener (e.g., a screw, a nail) with the rear mat facing the wall studs or ceiling joists. Two adjacent panels are joined at the seams using a suitable joint tape and joint compound. If desired, an additional flashing layer can be added as an air and water barrier. A cladding material (e.g., siding, shingle, stone) is further adhered to the exterior facing surface of the integrated panel.

FIG. 3 is a perspective view of a typical exterior sheathing system 20 that may be employed in the present exterior wall system. FIG. 3 shows an exterior sheathing panel 2 of the present invention attached to one side of a metal stud wall suitable in the exterior wall system of the present invention, wherein the exterior sheathing panel includes a cementitious panel selected from a gypsum panel (for example a panel of FIG. 2). FIG. 3 shows metal stud wall "skeleton" 22 which includes a plurality of metal studs 24, an upper track 26, a lower track 28. Sheathing panels 2 may be secured in any known manner to one or both sides of the metal studs 24 to close the wall and form the exterior surface or surfaces of the wall. A typical metal stud wall "skeleton" may be fabricated according to U.S. Pat. No. 6,694,695 to Collins et al., incorporated herein by reference, which is suitable for combination with an exterior sheathing panel to achieve an exterior wall system of the present invention. This metal frame system is merely provided as illustrative as other metal frames may also be employed. Or a wood frame may be employed.

In the system the exterior sheathing panels are typically attached to the framing by any one or more of screws, nails, or glue. Also, in the system the exterior sheathing panel typically has no perforations except for perforations made by the screws or nails.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise specified all percentages, ratios and average molecular weights are on a weight basis.

EXAMPLES

Example 1—Gypsum Building Panel

This example illustrates gypsum panel in accordance with the invention. The gypsum panel tested was a ⅝" (15.875 mm) thick, 48" (1219 mm) wide×96" (2438 mm) long, coated glass-mat board. The front and back cover sheets were coated fiber glass face mat and uncoated fiber glass back mat.

This missile impact test was a system test for gypsum board with mesh in the core and the coverings included foam board adhered to the surface of the gypsum board. In this example the test specimen was 20 oz./square yard (678 grams/square meter) ultra-high impact resistant mesh integrated into GMS (glass mat sheathing) back mat on 1 inch thick expanded polystyrene (EPS) foam board.

The impact resistant mesh for this example was an Ultra High Impact mesh having the following properties:
  alkali resistant fiberglass
  nominal basis areal weight of 20 ounces/yard$^2$ (692 g/m$^2$), 38 inch (96.5 cm) wide mesh.
  Ultra high strength Impact Classification of >150 in-lbs (>17.0 J) according to ASTM E2486 (2018) Standard Test Method for Impact Resistance of Class PB and PI Exterior Insulation and Finish Systems (EIFS).

The gypsum panels for the test specimens were prepared for the testing as follows:

The core of the gypsum panel was made from setting an aqueous gypsum slurry mixture and the composition on a dry (water free) basis listed in TABLE 2. The gypsum panel tested had a thickness of about 0.625 inches (15.875 mm).

TABLE 2

| Aqueous gypsum slurry composition | |
|---|---|
| Ingredients | Lbs/MSF |
| Stucco | 2153.57 |
| Gauging water | 1305.43 |
| Foam water | 63.58 |
| Soap | 0.12 |
| Heat Resistant Accelerator | 7.49 |
| Starch | 11.02 |
| Dispersant | 9.01 |
| Retarder | 0.30 |
| Paper fiber | 9.99 |
| Glass fiber | 8.99 |
| Total water | 1791.32 |
| Sodium trimetaphosphate at 10% solution in water | 6.02 |
| Siloxane | 10.99 |
| Fly ash | 13.00 |
| Biocide | 0.54 |

The board was made by placing a first non-woven fibrous mat sheet (that would become the rear cover sheet) in a mold, then placing the woven impact resistant mesh into the mold, and then applying an aqueous gypsum slurry to the non-woven fibrous mat sheet (rear cover sheet) and impact resistant woven scrim mesh in a mold. The gypsum slurry penetrated the non-woven fibrous mat sheet and embedded the impact resistant woven scrim mesh. Then a second non-woven fibrous mat sheet (that would become the front cover sheet) was applied to the gypsum slurry and the board was dewatered and allowed to set. The gypsum slurry embedded the impact resistant woven mesh a distance of about ¹⁄₁₆ to ⅛ inch (1.59 to 3.18 mm) from the rear surface of the panel and penetrated into the non-woven fabric of the front and back cover sheets to bond the non-woven fabric of the front and back cover sheets to the cement panel.

The missile impact test procedures were performed according to the 2017 Florida Building Code Test—Protocols for High-Velocity Hurricane Zone, Sixth Edition, Testing Application Standard (TAS) 201-94 Impact Test Procedures.

The test was performed at 73° F., 28% Relative Humidity. The missile length was 93⅜ inches. The missile mass was 9.01 pounds. The Barrel to Sample Distance was 208 feet. Missile speed at impact was 50±1 feet per second.

The test sample is considered to pass the TAS 201 Missile Impact Test if the following two statements are true:

The missile is rejected (the missile does not penetrate through the test sample).

There is no continuous crack 1/16" (1.59 mm) wide by 5" (127 mm) long (or larger).

Secondarily: If there are no 3/16 inch diameter holes, then the test also qualifies the product for small missile impact.

TABLE 3 shows the results for testing Sample Board 1 by the above-described procedure.

TABLE 3

| Sample ID-Impact No. | Impact Location | Missile Speed (fps) | Observations | Result |
|---|---|---|---|---|
| Sample 1-Impact 1 | 42 inches Up 24 inches Right | 49.9 | Test Sample Rejected the Missile. | Pass |
| Sample 1-Impact 2 | 67 inches Up 24 inches Right | 50.2 | Impact Area was on the seam with 4" wide mesh applied. Missile was rejected. Slight damage to back of sheathing at impact location. | Pass |
| Sample 1-Impact 3 | 6 inches Up 42 inches Right | 50.1 | Missile punctured through test sample. | Fail |
| Sample 1-Impact 4 | 6 inches Up 6 inches Right | 50.2 | N/A no mesh was installed at this corner. | N/A |
| Sample 1-Impact 5 | 42 inches Up 42 inches Right | 49.8 | Foam was cut away from target location Prior to test. Missile punctured through test sample. | Fail |

TABLE 4 shows the results for testing Sample Board 2 (having the same construction as Sample Board 1) by the above-described procedure.

TABLE 4

| Sample ID-Impact No. | Impact Location | Missile Speed (fps) | Observations | Result |
|---|---|---|---|---|
| Sample 2-Impact 1 | 42 inches Up 24 inches Right | 49.3 | Test Sample Rejected the Missile. | Pass |
| Sample 2-Impact 2 | 67 inches Up 24 inches Right | 50.2 | Test location was at a seam with no mesh overlap. Missile punctured through the test sample. | Fail |
| Sample 2-Impact 3 | 29 inches Up 24 inches Right | 49.9 | Test location was at a seam with 6" wide 15 oz/yd2 mesh overlap. Test sample rejected the missile. | Pass |
| Sample 2-Impact 4 | 48 inches Up 6 inches Right | 50.0 | Missile rejected. Sheathing cracked but no 1/16" × 5" crack noted. The sheathing behind the impact location cracked. | Pass |
| Sample 2-Impact 5 | 6 inches Up 42 inches Right | 49.8 | Missile passed through sheathing. | Fail |
| Sample 2-Impact 56 | 6 inches Up 6 inches Right | | Shims were placed between the sheathing and the frame in order to fill the gap caused by the sheathing resting against the head of the stud to plate screw. Missile passed through the sheathing. | Fail |

Figure 4:
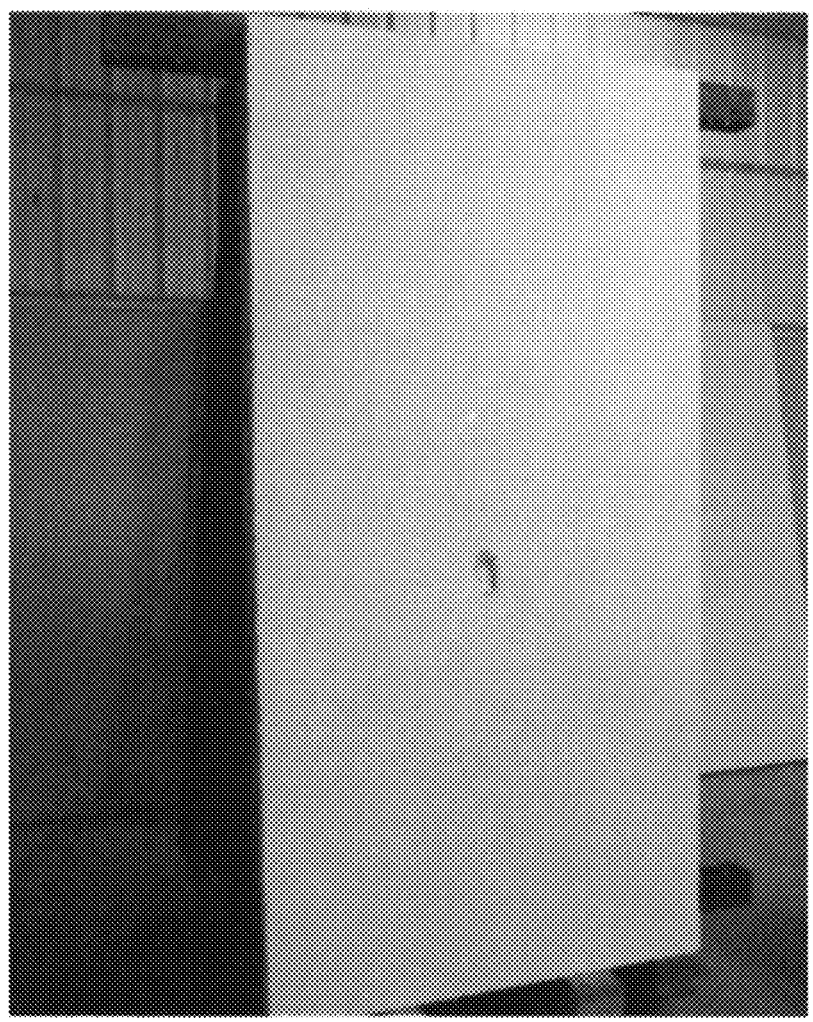
FIG. 4 shows a photograph of a front view of Test Sample 1 Impact 1 of the examples.

FIG. 4 shows a photograph of a front view of Test Sample 1 Impact 1 of the examples.

Figure 5:
FIG. 5 shows a photograph of a rear view of Test Sample 1 Impact 1 of the examples.

FIG. 5 shows a photograph of a rear view of Test Sample 1 Impact 1 of the examples.

Figure 6:
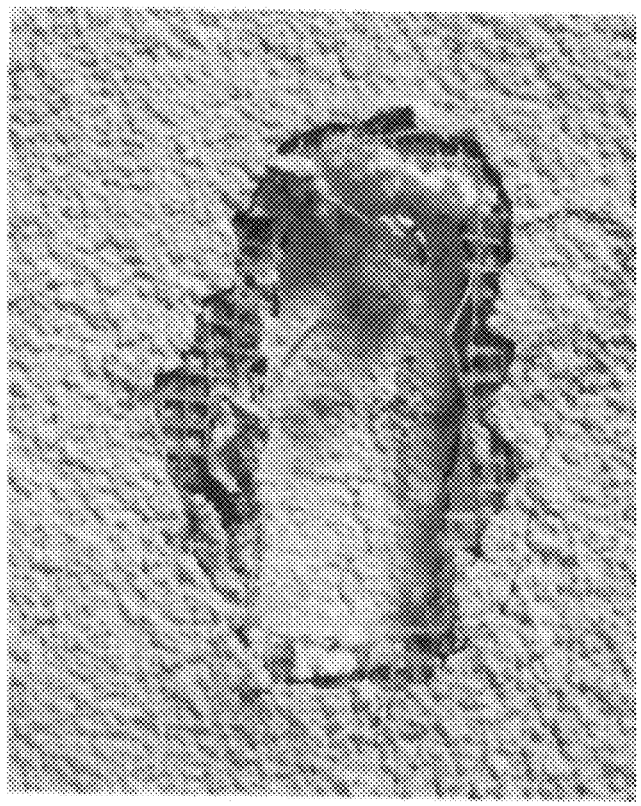
FIG. 6 shows a photograph of a front view of Test Sample 1 Impact 2 of the examples.

FIG. 6 shows a photograph of a front view of Test Sample 1 Impact 2 of the examples.

Figure 7:
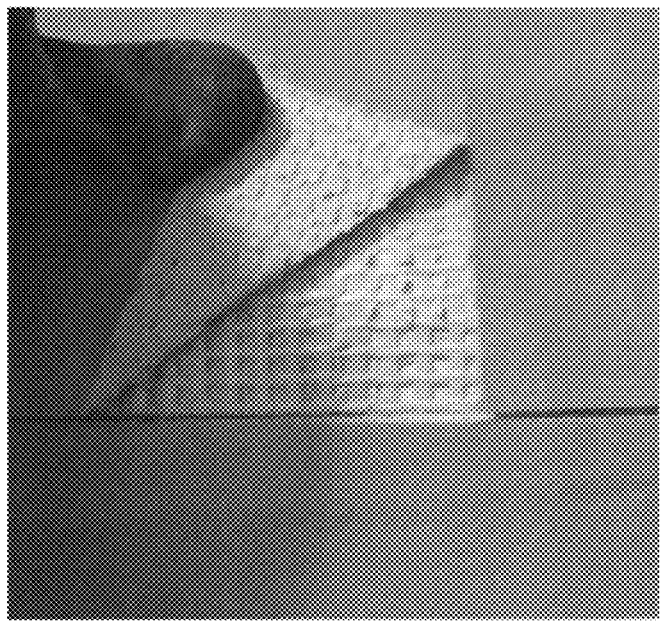
FIG. 7 shows a photograph of a rear view of Test Sample 1 Impact 2 of the examples.

FIG. 7 shows a photograph of a rear view of Test Sample 1 Impact 2 of the examples.

Figure 8:
FIG. 8 shows a photograph of a front view of Test Sample 1 Impact 3 of the examples.

FIG. 8 shows a photograph of a front view of Test Sample 1 Impact 3 of the examples.

Figure 9:
FIG. 9 shows a photograph of a front view of Test Sample 1 Impact 4 of the examples.

FIG. 9 shows a photograph of a front view of Test Sample 1 Impact 4 of the examples.

Figure 10:
FIG. 10 shows a photograph of a front view of Test Sample 2 Impact 1 of the examples.

FIG. 10 shows a photograph of a front view of Test Sample 2 Impact 1 of the examples.

Figure 11:
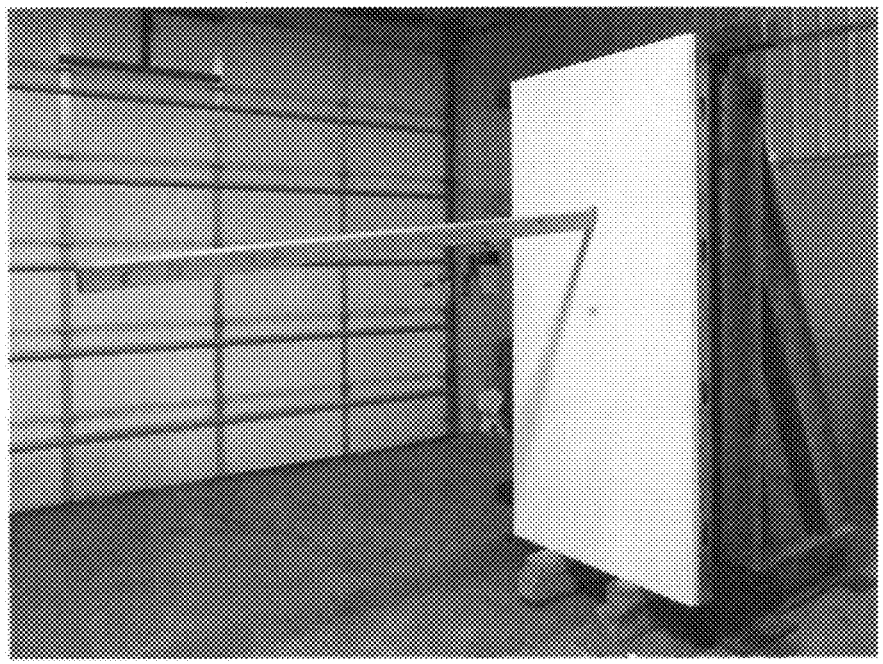
FIG. 11 shows a photograph of a front view of Test Sample 2 Impact 2 (comparative example, no mesh at joint) of the examples.

FIG. 11 shows a photograph of a front view of Test Sample 2 Impact 2 (comparative example, no mesh at joint) of the examples.

Figure 12:
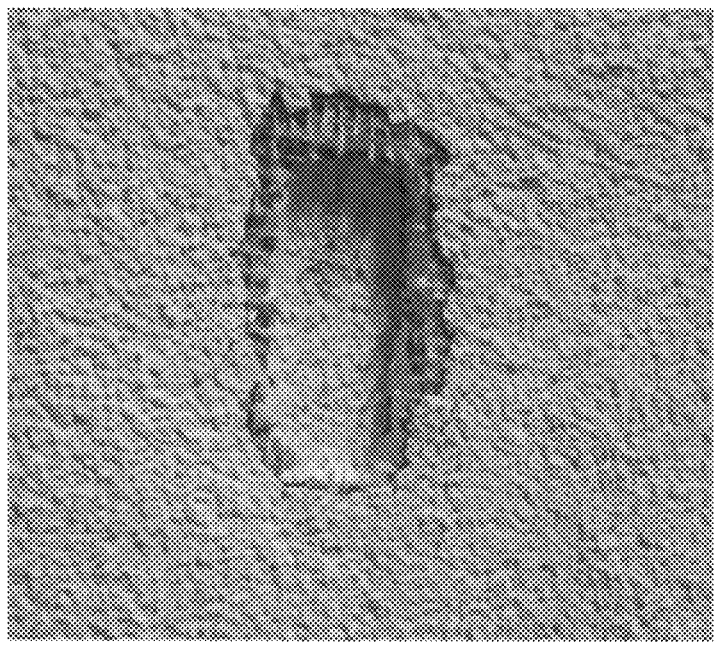
FIG. 12 shows a photograph of a front view of Test Sample 2 Impact 3 of the examples.

FIG. 12 shows a photograph of a front view of Test Sample 2 Impact 3 of the examples.

Figure 13:
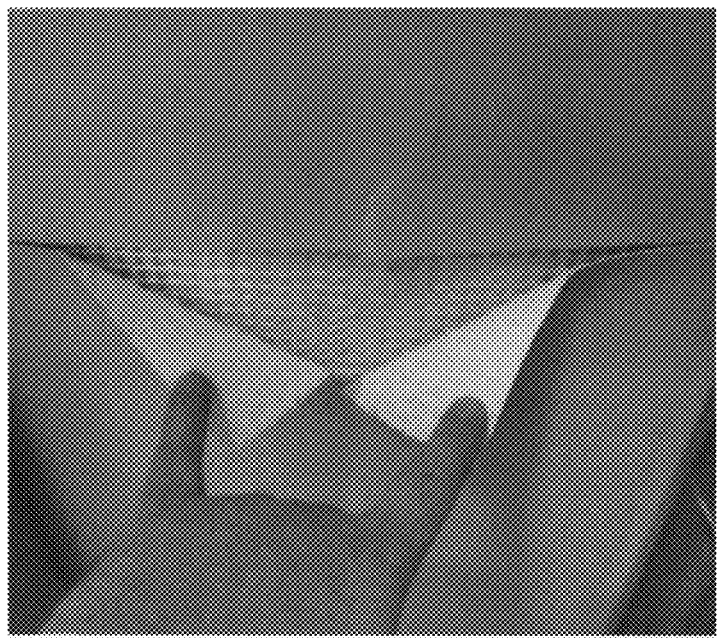
FIG. 13 shows a photograph of a rear view of Test Sample 2 Impact 3 of the examples.

FIG. 13 shows a photograph of a rear view of Test Sample 2 Impact 3 of the examples.

Figure 14:
FIG. 14 shows a photograph of a front view of Test Sample 2 Impact 4 (comparative example) of the examples.

FIG. 14 shows a photograph of a front view of Test Sample 2 Impact 4 (comparative example) of the examples.

Figure 15:
FIG. 15 shows a photograph of a front view of Test Sample 2 Impact 5 (comparative example) of the examples.

FIG. 15 shows a photograph of a front view of Test Sample 2 Impact 5 (comparative example) of the examples.

Figure 16:
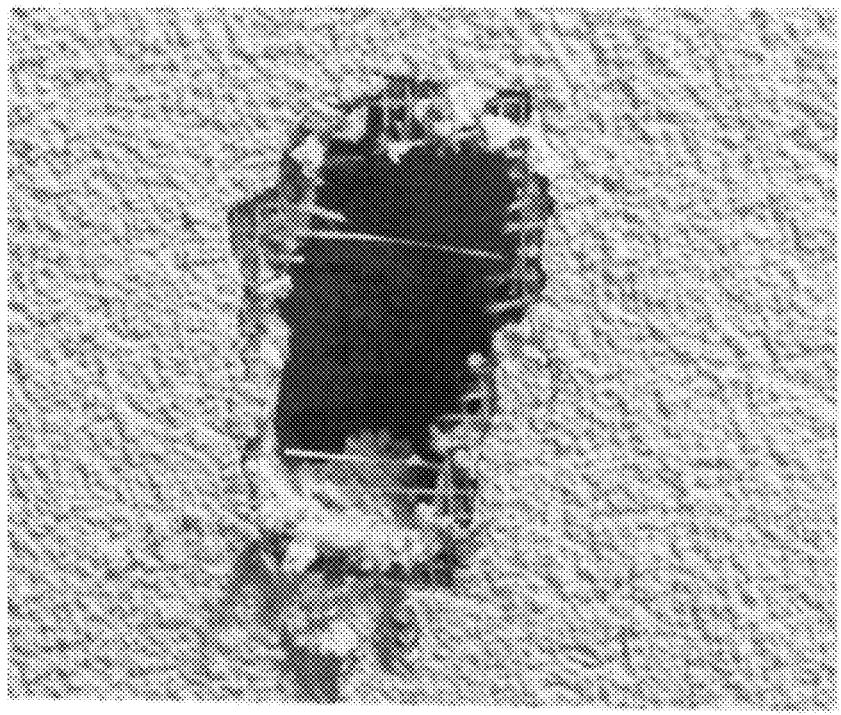
FIG. 16 shows a photograph of a front view of Test Sample 2 Impact 6 (comparative example) of the examples.

FIG. 16 shows a photograph of a front view of Test Sample 2 Impact 6 (comparative example) of the examples.

Figure 17:
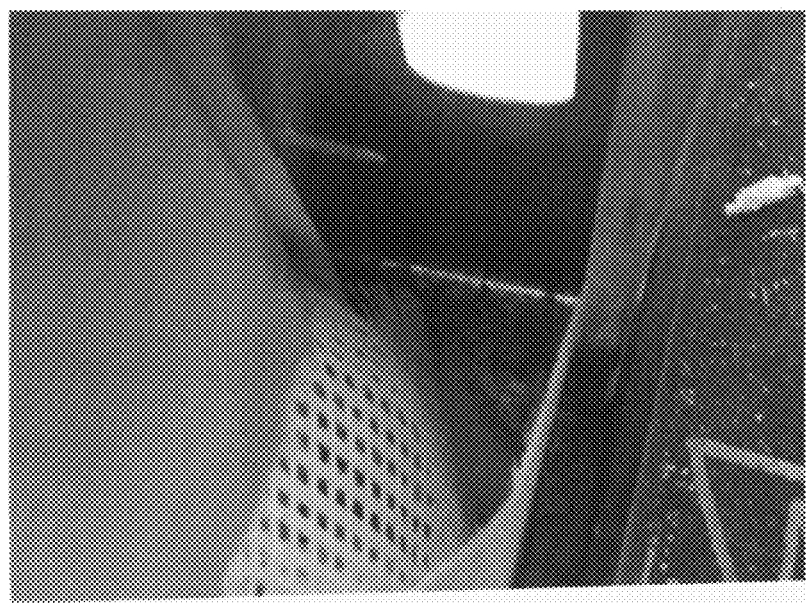
FIG. 17 shows a photograph of a rear view of Test Sample 2 Impact 6 (comparative example) of the examples.

FIG. 17 shows a photograph of a rear view of Test Sample 2 Impact 6 (comparative example) of the examples.

The data of TABLES 3 and 4 and FIGS. 4-17 shows that the board of the invention meets the Testing Application Standard (TAS) 201 Missile Impact Test.

CLAUSES OF THE INVENTION

Clause 1. A building panel comprising, from front to back:
a first fibrous mat,
a gypsum core layer having front and rear surfaces, the gypsum core layer having a thickness of 0.5 to 1.25, preferably 0.5 to 1, inches, wherein the first fibrous mat is attached as a facer cover sheet to the front surface of the gypsum core layer,
an impact resistant woven scrim mesh, embedded ¼ to 1/16 inch, preferably ⅛ to 1/16 inch, from the rear surface of the gypsum core layer,
a second fibrous mat attached as a backer cover sheet to the rear surface of the gypsum core layer,
wherein the gypsum core layer comprises at least 75 wt. % calcium sulfate material, wherein the gypsum core layer comprises less than 10 wt. % magnesium oxide, preferably less than 5 wt. % magnesium oxide, most preferably an absence of magnesium oxide;

wherein the first fibrous mat and second fibrous mat respectively comprise paper or fibrous material of at least one of polymer fibers, glass fibers, mineral fibers or a combination thereof, wherein the impact resistant mesh has an Impact Range Classification of >150 in-pounds (>17.0 J) (also known as "Ultra-High") according to ASTM E2486 (2018) Standard Test Method for Impact Resistance of Class PB and PI Exterior Insulation and Finish Systems (EIFS).

Clause 2. The building panel of Clause 1, wherein the impact resistant mesh has one or more of the following properties:

fabric surface weight of 20 to 30 ounces per square yard (690 to 1035 g/m$^2$) (measured according to ASTM D3776/D3776M-09a (2017), Standard Test Methods for Mass Per Unit Area (Weight) of Fabric, ASTM International, West Conshohocken, PA, 2017), a thickness of 0.040 to 0.045 inches (1.02 to 1.14 mm) (measured according to ASTM D-1777-96(2015), Standard Test Method for Thickness of Textile Materials, ASTM International, West Conshohocken, PA, 2015), and a minimum tensile strength of 350 to 540 pounds-force per inch (2.41 to 3.72 MPa) in the warp and weft, respectively (measured according to ASTM D-5035-11 (2019), Standard Test Method for Breaking Force and Elongation of Textile Fabrics (Strip Method), ASTM International, West Conshohocken, PA, 2017).

Clause 3. The building panel of Clause 1 or 3, wherein the exterior sheathing building panel of the invention provides an exterior sheathing building panel that meets 2017 Florida Building Code Test—Protocols for High-Velocity Hurricane Zone, Chapter 16, Section 1626, Sixth Edition, to be capable of resisting a 2 inches×4 inches (51 mm×102 mm) missile weighing 9 pounds (4.1 kg) in accordance with 2017 Florida Building Code Test—Testing Application Standard (TAS) 201-94 Impact Test Procedures.

Clause 4. The building panel of Clause 3, wherein this missile is a 2 inch×4 inch×8 foot wood stud, and the missile shall impact the surface of each test specimen at a speed of 50 feet per second (34 miles per hour; 15.2 m/s).

Clause 5. The building panel of any of Clauses 1 to 4, wherein the mesh is spaced from the rear mat to form a gap filled with slurry to bond the mat to core bond, wherein the gap is about 1/16 inch-1/8 inch embedment.

Clause 6. The building panel of any of Clauses 1 to 5, wherein the slurry penetration into each said mat ranges from 40 to 60% of the respective mat thickness.

Clause 7. The building panel of any of Clauses 1 to 6, wherein the cementitious core comprises a gypsum panel core layer comprising cementitious material comprising at least 85 weight % calcium sulfate dihydrate, more typically at least 95 weight % calcium sulfate dihydrate.

Clause 8. The building panel of any of Clauses 1 to 7, wherein a first skim layer is located between the first fibrous mat and the gypsum core layer.

Clause 9. The building panel of Clause 8, wherein a second skim layer is located between the second fibrous mat and the gypsum core layer;

Clause 10. The building panel of Clause 1,
wherein the impact resistant mesh comprises an alkali resistant fiberglass mesh reinforcement embedded in the core layer, and wherein the fiberglass mesh reinforcement is a mesh scrim having about 4×4 to 6×6 strand per inch construction in the longitudinal and transverse direction, respectively, wherein the fiberglass mesh reinforcement is made from a fiberglass yarn, the yarn in an uncoated state has a nominal density of about 1200 to 5000 linear yards per pound of fiberglass yarn, and wherein the fiberglass yarn comprises 0-65 wt. %, for example 5-65 wt. %, coating on a dry (water free) basis; and wherein the coating comprises alkali resistant polymer.

Clause 11. The building panel of Clause 1, wherein at least one of the first and second fibrous mats respectively comprises coated woven said fiber material or uncoated woven said fiber material.

Clause 12. The building panel of Clause 1, wherein at least one of the first and second fibrous mats respectively comprises coated non-woven said fiber material or uncoated non-woven said fiber material.

Clause 13. A method of making the building panel of any of Clauses 1 to 12, comprising:

depositing a first fibrous mat as a face mat on a surface,
mixing at least water and calcium sulfate material to prepare an aqueous gypsum slurry comprising at least 75 wt. % calcium sulfate material on a dry (water free) basis, wherein said calcium sulfite material comprises calcium sulfate hemihydrate, wherein the aqueous gypsum slurry comprises less than 10 wt. % magnesium oxide on a dry (water free) basis, preferably less than 5 wt. % magnesium oxide on a dry (water free) basis, most preferably an absence of magnesium oxide;

applying the aqueous gypsum slurry in a bonding relation to the face mat to form a gypsum core layer, the gypsum core layer having a face side and a back side, wherein the gypsum core layer face side faces said face mat;

applying an impact resistant woven scrim mesh on the back side of the gypsum core layer to embed the impact resistant woven scrim mesh into the gypsum core layer;

applying a second fibrous mat as a back mat on the back side of the gypsum core layer having the embedded impact resistant mesh to form a board precursor, thereby locating the aqueous slurry between the face mat and the back mat;

allowing the aqueous gypsum slurry located between the face mat and the back mat to set, thereby forming the gypsum exterior sheathing building panel.

Clause 14. The method of Clause 13, wherein the impact resistant mesh is embedded on the top of the deposited slurry such that a portion of slurry is exposed over the embedded impact resistant mesh, and covering the wet slurry with the backer cover sheet of the same type of material as the facer cover sheet, whereby the cementitious slurry and embedded impact resistant mesh is sandwiched between the two cover sheets.

Clause 15. The method of Clause 13, wherein the calcium sulfate material and water are mixed resulting in the aqueous gypsum slurry having at least 75 wt. %, preferably at least 85 wt. %, most preferably at least 95 wt. %, on a dry basis calcium sulfate hemihydrate, and wherein excess water is removed from the gypsum slurry by drying and rehydration which converts the calcium sulfate hemihydrate to the calcium sulfate dihydrate of a set gypsum core.

Clause 16. The method of Clause 13, wherein the aqueous gypsum slurry contains 75 to 100 wt. % reactive powder on a dry (water free) basis to provide the aqueous gypsum slurry with at least 75 wt. % calcium sulfate material on a dry (water free) basis, preferably at least 75 wt. % calcium sulfate hemihydrate on a dry (water free) basis.

Clause 17. An exterior sheathing system of a building comprising framing to which is attached a plurality of said exterior sheathing panels of any of Clauses 1 to 12, wherein the rear mat faces towards the framing, wherein the exterior sheathing panel is on an exterior of the building.

The invention is not to be limited by the above description but rather by the claims amended hereto.

We claim:

1. A building panel comprising, from front to back:
   a first nonwoven fibrous mat,
   a continuous gypsum core layer having front and rear surfaces, the gypsum core layer having a thickness of 0.5 to 1.25 inches, wherein the first fibrous mat is directly attached as a facer cover sheet to the front surface of the gypsum core layer and the gypsum core layer penetrates into the first fibrous mat,
   an impact resistant woven scrim mesh, embedded ¼ to ¹⁄₁₆ inch from the rear surface of the gypsum core layer,
   a second nonwoven fibrous mat directly attached as a backer cover sheet to the rear surface of the gypsum core layer and the gypsum core layer penetrates into the second fibrous mat,
   wherein the building panel has only one woven scrim mesh embedded in the gypsum core layer between the facer and backer cover sheets,
   wherein the gypsum core layer comprises at least 75 wt. % calcium sulfate material,
   wherein the gypsum core layer comprises less than 10 wt. % magnesium oxide;
   wherein the first fibrous mat and second fibrous mat respectively comprise paper or fibrous material of at least one of polymer fibers, glass fibers, mineral fibers or a combination thereof,
   wherein the impact resistant mesh has an Impact Range Classification of >150 in-pounds (>17.0 J) according to ASTM E2486, 2018, Standard Test Method for Impact Resistance of Class PB and PI Exterior Insulation and Finish Systems (EIFS);
   wherein the impact resistant mesh has the following properties:
   fabric surface weight of 20 to 30 ounces per square yard (690 to 1035 g/m²) as measured according to ASTM D3776/D3776M-09a, 2017, Standard Test Methods for Mass Per Unit Area, Weight of Fabric, and
   a minimum tensile strength of 350 to 540 pounds-force per inch (2.41 to 3.72 MPa) in the warp and weft, respectively as measured according to ASTM D-5035-11, 2019, Standard Test Method for Breaking Force and Elongation of Textile Fabrics, Strip Method,
   wherein the building panel meets 2017 Florida Building Code Test—Protocols for High-Velocity Hurricane Zone, Chapter 16, Section 1626, Sixth Edition, to be capable of resisting a 2 inches×4 inches missile weighing 9 pounds in accordance with 2017 Florida Building Code Test—Testing Application Standard (TAS) 201-94 Impact Test Procedures.

2. The building panel of claim 1, wherein the impact resistant mesh has
   a thickness of 0.040 to 0.045 inches as measured according to ASTM D-1777-96, 2015, Standard Test Method for Thickness of Textile Materials.

3. The building panel of claim 1,
   wherein the impact resistant mesh comprises an alkali resistant fiberglass mesh reinforcement embedded in the core layer, and wherein the fiberglass mesh reinforcement is a mesh scrim having about 4×4 to 6×6 strand per inch construction in the longitudinal and transverse direction, respectively,
   wherein the fiberglass mesh reinforcement is made from a fiberglass yarn, the yarn in an uncoated state has a nominal density of about 1200 to 5000 linear yards per pound of fiberglass yarn,
   wherein the fiberglass yarn comprises 0-65 wt. % coating on a dry basis; and
   wherein the coating comprises alkali resistant polymer.

4. The building panel of claim 1, wherein this missile is a 2 inch×4 inch×8 foot wood stud, and the missile shall impact the surface of each test specimen at a speed of 50 feet per second (34 miles per hour; 15.2 m/s).

5. The building panel of claim 1, wherein the mesh is spaced from the second fibrous mat to form a gap filled with slurry to bond the second fibrous mat to the core layer, wherein the gap is about ¹⁄₁₆ inch-⅛ inch embedment.

6. The building panel of claim 1, wherein the gypsum core layer is formed from a slurry, wherein the slurry penetration into each said mat ranges from 40 to 60% of the respective mat thickness.

7. The building panel of claim 1, wherein the cementitious core comprises a gypsum panel core layer comprising cementitious material comprising at least 85 weight % calcium sulfate dihydrate.

8. The building panel of any of claim 1, wherein a first skim layer is located between the first fibrous mat and the gypsum core layer.

9. The building panel of claim 8, wherein a second skim layer is located between the second fibrous mat and the gypsum core layer.

10. The building panel of claim 1,
    wherein the impact resistant mesh comprises an alkali resistant fiberglass mesh reinforcement embedded in the core layer, and wherein the fiberglass mesh reinforcement is a mesh scrim having about 4×4 to 6×6 strand per inch construction in the longitudinal and transverse direction, respectively,
    wherein the fiberglass mesh reinforcement is made from a fiberglass yarn, the yarn in an uncoated state has a nominal density of about 1200 to 5000 linear yards per pound of fiberglass yarn, and
    wherein the fiberglass yarn comprises 0-65 wt. % coating on a dry basis; and
    wherein the coating comprises alkali resistant polymer.

11. The building panel of claim 1, wherein at least one of the first and second fibrous mats comprises coated nonwoven said fiber material.

12. The building panel of claim 1, wherein at least one of the first and second fibrous mats comprises uncoated nonwoven said fiber material.

13. A method of making the building panel of claim 1, comprising:
    depositing a first fibrous mat as a face mat on a surface,
    mixing at least water and calcium sulfate material to prepare an aqueous gypsum slurry comprising at least 75 wt. % calcium sulfate material on a dry (water free) basis, wherein said calcium sulfite material comprises calcium sulfate hemihydrate,
    wherein the aqueous gypsum slurry comprises less than 10 wt. % magnesium oxide on a dry (water free) basis;
    applying the aqueous gypsum slurry in a bonding relation to the face mat to form a gypsum core layer, the gypsum core layer having a face side and a back side, wherein the gypsum core layer face side faces said face mat;

applying an impact resistant woven scrim mesh on the back side of the gypsum core layer to embed the impact resistant woven scrim mesh into the gypsum core layer;

applying a second fibrous mat as a back mat on the back side of the gypsum core layer having the embedded impact resistant mesh to form a board precursor, thereby locating the aqueous slurry between the face mat and the back mat;

allowing the aqueous gypsum slurry located between the face mat and the back mat to set, thereby forming the gypsum building panel.

14. The method of claim 13, wherein the impact resistant mesh is embedded on the top of the deposited slurry such that a portion of slurry is exposed over the embedded impact resistant mesh, and covering the wet slurry with the backer cover sheet of the same type of material as the facer cover sheet, whereby the cementitious slurry and embedded impact resistant mesh is sandwiched between the two cover sheets.

15. The method of claim 13, wherein the calcium sulfate material and water are mixed resulting in the aqueous gypsum slurry having at least 75 wt. % on a dry basis calcium sulfate hemihydrate, and wherein excess water is removed from the gypsum slurry by drying and rehydration which converts the calcium sulfate hemihydrate to the calcium sulfate dihydrate of a set gypsum core.

16. The method of claim 13, wherein the aqueous gypsum slurry contains 75 to 100 wt. % reactive powder on a dry (water free) basis to provide the aqueous gypsum slurry with at least 75 wt. % calcium sulfate material on a dry (water free) basis.

17. An exterior system of a building comprising framing to which is attached a plurality of said building panels of claim 1, wherein the rear mat faces towards the framing, wherein the building panel is on an exterior of the building.

18. The building panel of claim 1, wherein the first fibrous mat and second fibrous mat respectively comprise at least one of polymer fibers, glass fibers, mineral fibers or a combination thereof.

19. The building panel of claim 1, wherein the first fibrous mat and second fibrous mat respectively comprise glass fibers.

20. The building panel of claim 4, wherein the first fibrous mat comprises a coated fiber glass mat and the second fibrous mat comprises an uncoated fiber glass mat.

* * * * *